US012482616B2

(12) United States Patent
Tsuchiya

(10) Patent No.: US 12,482,616 B2
(45) Date of Patent: Nov. 25, 2025

(54) INPUT DEVICE

(71) Applicant: ALPS ALPINE CO., LTD., Tokyo (JP)

(72) Inventor: Tomoaki Tsuchiya, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 260 days.

(21) Appl. No.: 18/521,206

(22) Filed: Nov. 28, 2023

(65) Prior Publication Data

US 2024/0096572 A1 Mar. 21, 2024

Related U.S. Application Data

(63) Continuation of application No. PCT/JP2022/010659, filed on Mar. 10, 2022.

(30) Foreign Application Priority Data

Jul. 27, 2021 (JP) ................................ 2021-122184

(51) Int. Cl.
*H01H 25/04* (2006.01)
*H01H 23/30* (2006.01)

(52) U.S. Cl.
CPC ............ *H01H 25/04* (2013.01); *H01H 23/30* (2013.01)

(58) Field of Classification Search
CPC ........... H01H 2013/00; H01H 2013/02; H01H 2013/50; H01H 2013/52; H01H 2013/56;
(Continued)

(56) References Cited

U.S. PATENT DOCUMENTS 6,737,592 B1 * 5/2004 Hoang ................. H01H 23/003 200/1 B
7,439,459 B2 * 10/2008 Hyun ..................... H01H 23/16 200/61.54
2006/0102453 A1 5/2006 Miyauchi

FOREIGN PATENT DOCUMENTS

JP H04-127935 U 11/1992
JP 2000-011807 1/2000
(Continued)

OTHER PUBLICATIONS

International Search Report for PCT/JP2022/010659 mailed on May 24, 2022.

*Primary Examiner* — Anthony R Jimenez
(74) *Attorney, Agent, or Firm* — IPUSA, PLLC

(57) ABSTRACT

An input device includes housing; operation nob; cam member swingable in a direction intersecting with pivoting direction of operation knob, and performing swinging as first movement in response to operation knob pivoting in first angular range and performing swinging as second movement succeeding first movement in response to operation knob pivoting in second angular range; substrate; first switch on substrate, switched on in conjunction with first movement of cam member; and second switch on substrate, switched on in conjunction with second movement of cam member. When operation force is ceased, operation knob is automatically restored by restoring forces from first and second switches. Input device includes: first actuator to be slid in conjunction with first movement of cam member to push first switch perpendicularly to substrate; and second actuator to be slid in conjunction with second movement of cam member to push second switch perpendicularly to substrate.

11 Claims, 29 Drawing Sheets

(58) Field of Classification Search
CPC ......... H01H 2215/01; H01H 2215/004; H01H 2215/008; H01H 2215/012; H01H 2221/016; H01H 2231/026; H01H 23/00; H01H 23/30; H01H 23/02; H01H 23/14; H01H 23/148; H01H 23/16; H01H 23/168; H01H 23/205; H01H 23/24; H01H 23/26; H01H 3/00; H01H 3/02; H01H 3/04; H01H 3/32; H01H 3/42; H01H 3/46; H01H 2001/22; H01H 2001/221; H01H 2001/36; H01H 25/00; H01H 25/04
USPC ........................................................ 200/5 R
See application file for complete search history.

(56) References Cited

FOREIGN PATENT DOCUMENTS

| | | |
|---|---|---|
| JP | 2006-140060 | 6/2006 |
| JP | 2013-225390 | 10/2013 |
| KR | 10-2014-0012237 | 2/2014 |
| WO | 2017/217027 | 12/2017 |

* cited by examiner

INPUT DEVICE

CROSS-REFERENCE TO RELATED APPLICATIONS

This application is a continuation application of International Application No. PCT/JP2022/010659, filed on Mar. 10, 2022, and designating the U.S., which is based upon and claims priority to Japanese Patent Application No. 2021-122184, filed Jul. 27, 2021, the entire contents of which are incorporated herein by reference.

BACKGROUND

Technical Field

The present invention relates to an input device.

Description of Related Art

Japanese Patent No. 3810920 discloses a two-stage operable switch device for power window operation, wherein a first switch and a second switch can be switched on over two stages in accordance with a pivotally operated position of an operation knob.

SUMMARY

However, the technique disclosed in Japanese Patent No. 3810920 has a configuration in which a pusher inclines and obliquely pushes a restoring means (dome portion) of a rubber sheet. Hence, the dome portion is pushed obliquely downward and elastically deforms while twisting. Hence, compared with a configuration in which a dome portion is pushed straightly downward, fatigue is likely to accumulate in a local part of the dome portion. Moreover, because the dome portion becomes locally broken due to the accumulated fatigue, the lifetime of the rubber sheet is likely to be shortened.

An input device according to an embodiment includes: a housing; an operation knob supported on the housing and configured to pivot by receiving an operation force from an operator; a cam member situated swingably in a direction intersecting with a pivoting direction in which the operation knob pivots, and configured to perform swinging as a first movement in response to the operation knob pivoting in a first angular range and to perform swinging as a second movement succeeding the first movement in response to the operation knob pivoting in a second angular range succeeding the first angular range; a substrate situated in the housing; a first switch situated on the substrate and configured to be switched on in conjunction with the first movement of the cam member; and a second switch situated on the substrate and configured to be switched on in conjunction with the second movement of the cam member. When the operation force on the input device is ceased, the operation knob is automatically restored by restoring forces from the first switch and the second switch. The input device further includes: a first actuator configured to be slid in conjunction with the first movement of the cam member and push the first switch in a direction perpendicular to the substrate; and a second actuator configured to be slid in conjunction with the second movement of the cam member and push the second switch in the direction perpendicular to the substrate.

According to an embodiment, a switch device having an improved rubber sheet lifetime can be realized.

DETAILED DESCRIPTION

An embodiment will be described below with reference to the drawings. In the following description, for expediency, the X-axis direction is described as a front-rear direction, the Y-axis direction is described as a left-right direction, and the Z-axis direction is described as an upper-lower (top-bottom) direction. The X-axis positive direction is described as a front direction, the Y-axis positive direction is described as a right direction, and the Z-axis positive direction is described as an upper (top) direction.

(Overview of Input Device 100)

Figure 1:
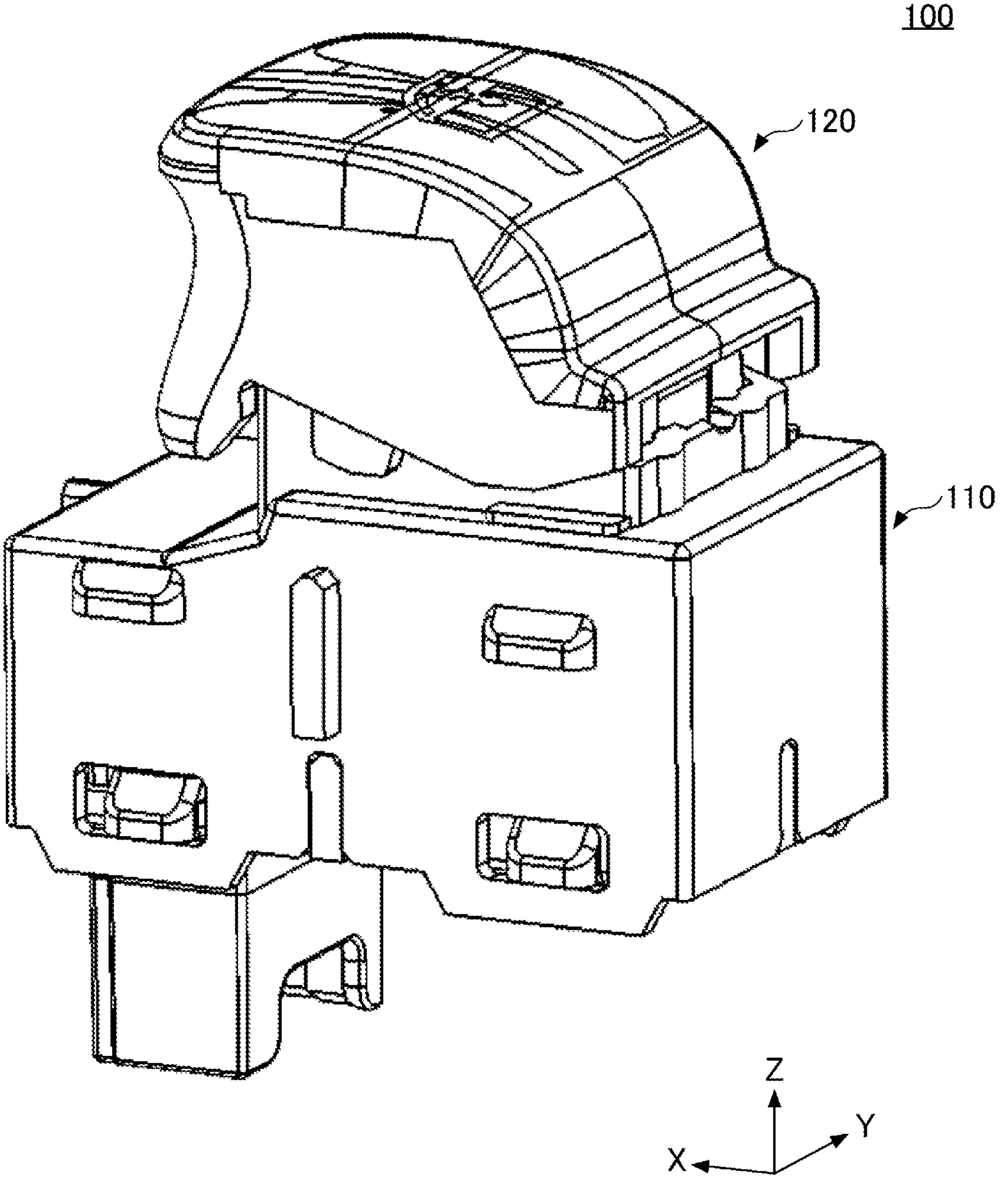
FIG. 1 is an oblique external view of an input device according to an embodiment.
Figure 2:
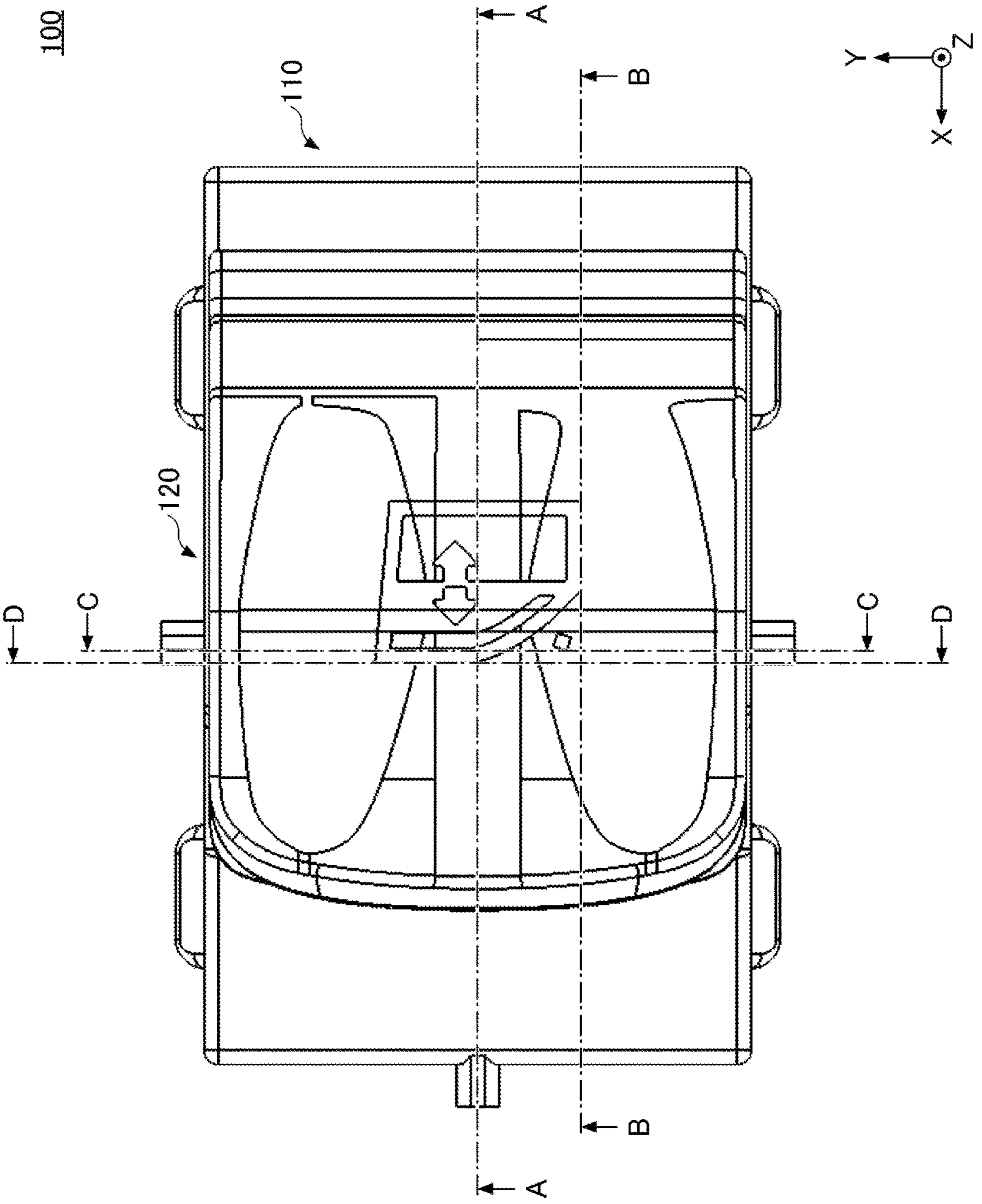
FIG. 2 is a plan view of an input device according to an embodiment.

FIG. 1 is an oblique external view of an input device 100 according to an embodiment. FIG. 2 is a plan view of the input device 100 according to an embodiment.

The input device 100 illustrated in FIG. 1 can be used as an input device for operating a vehicle-mounted device (e.g., a power window) that is situated in a vehicle such as an automobile and electrically driven. The input device 100 includes a housing 110, and an operation knob 120 coupled to an upper side of the housing 110 and supported such that it is pivotally operable. For example, the input device 100 generates a detection signal when the operation knob 120 is pivotally operated, and sends the detection signal to a driving unit (non-illustrated) for the power window, the driving unit being situated separately from the input device 100. The driving unit having received the detection signal becomes driven and opens or closes the window of the vehicle.

(Configuration of Input Device 100)

Figure 3:
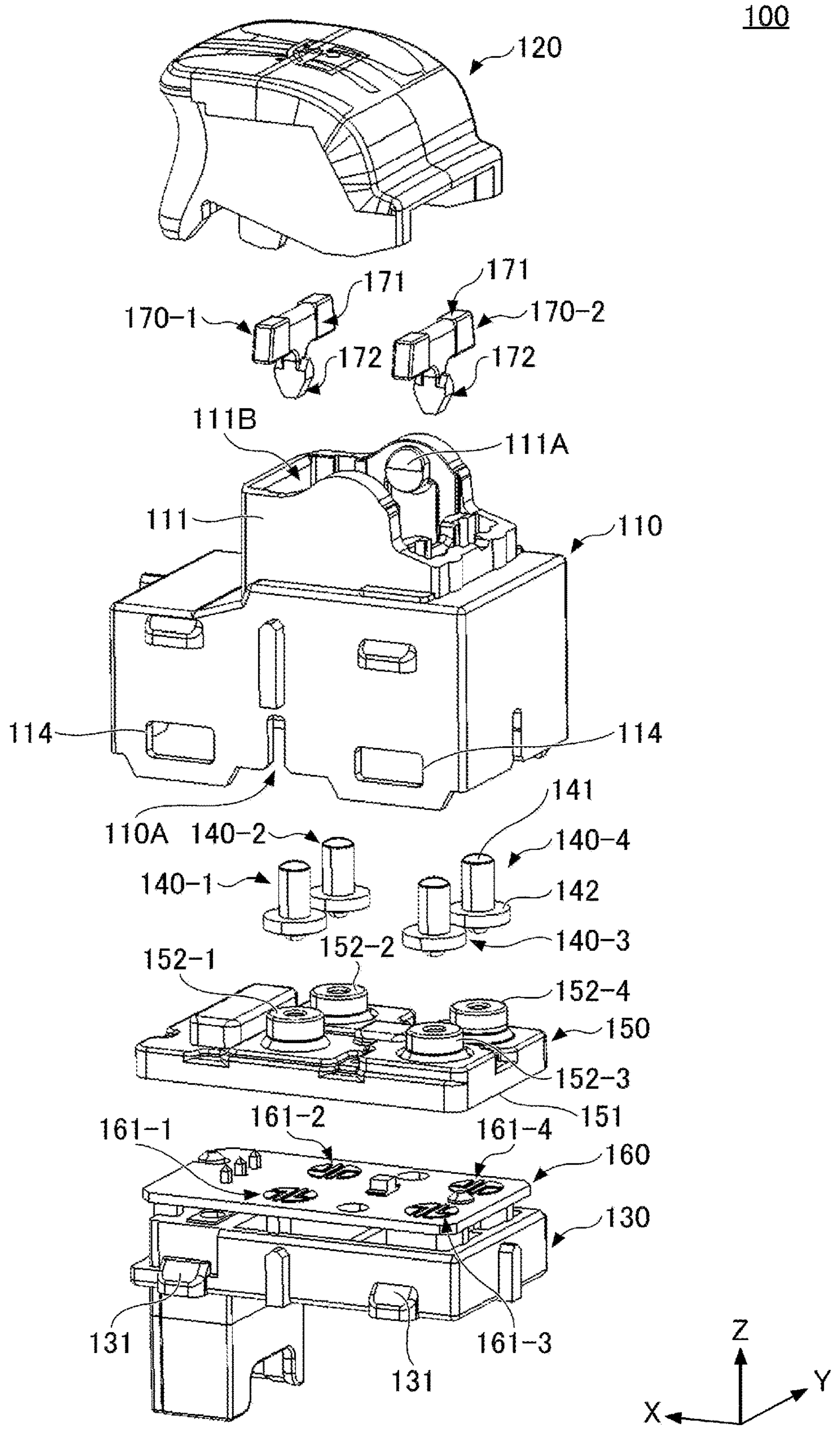
FIG. 3 is an oblique exploded view of an input device according to an embodiment.
Figure 4:
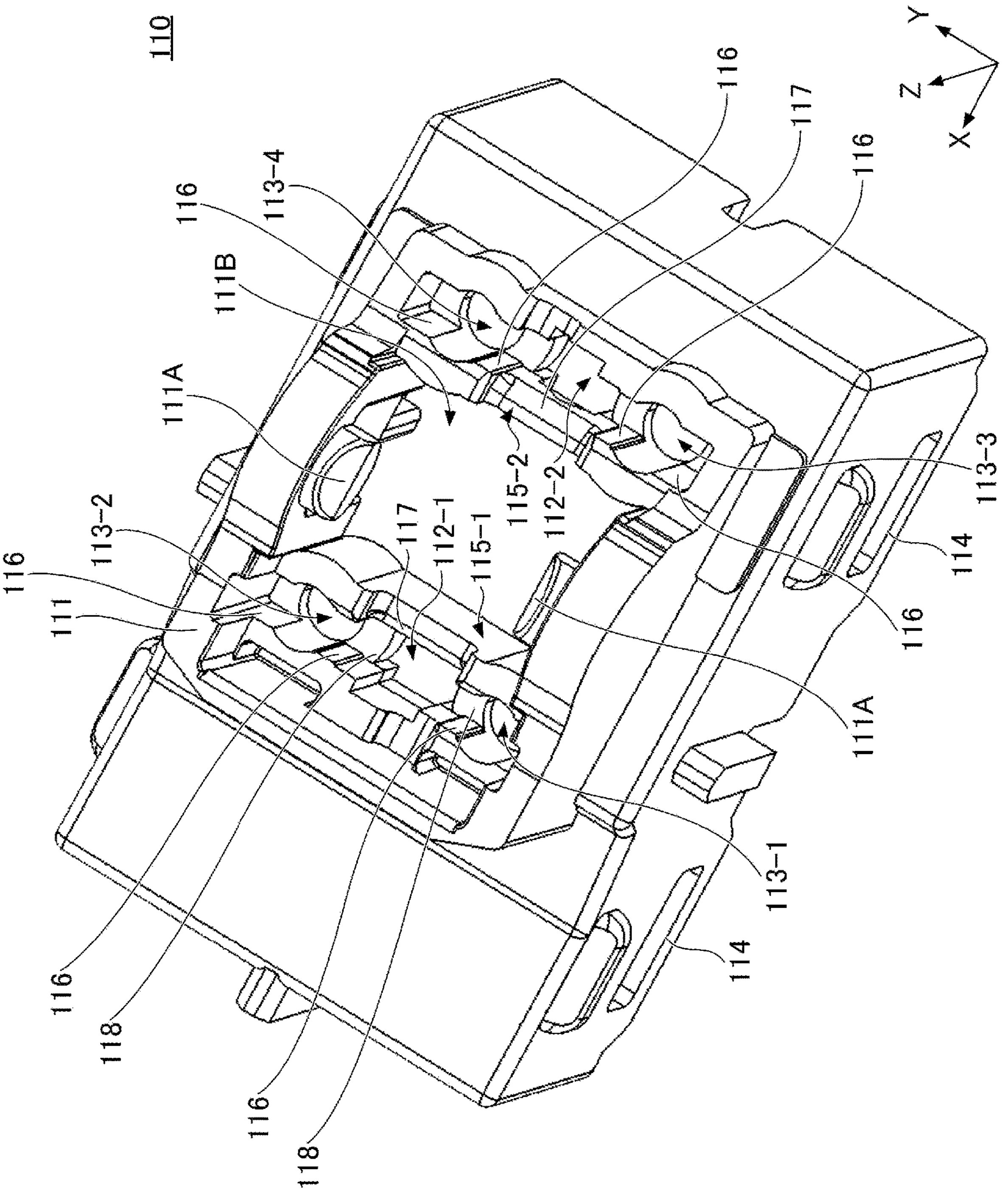
FIG. 4 is an oblique external view of a housing of an input device according to an embodiment.
Figure 5A:
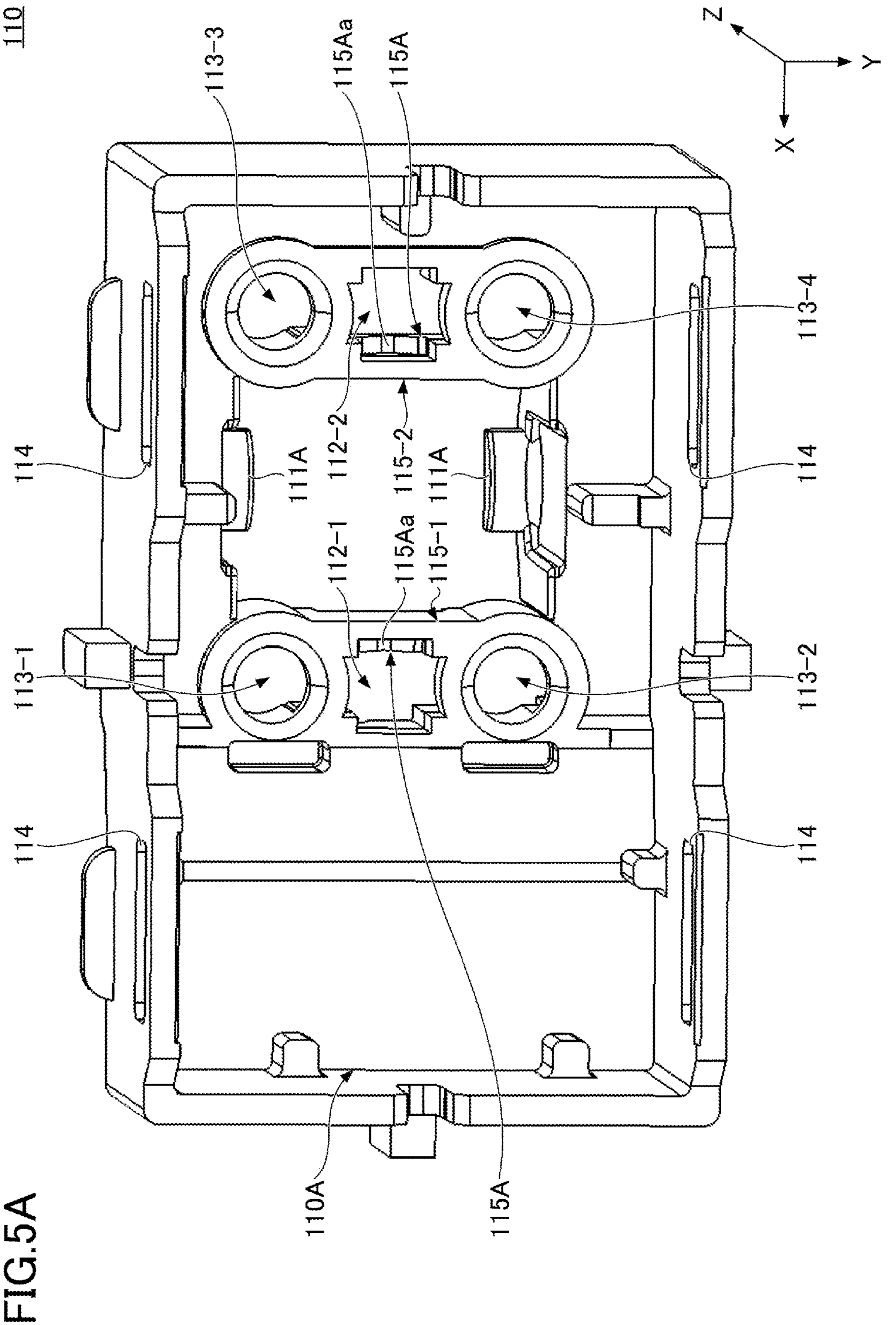
FIG. 5A is an oblique external view of a housing of an input device according to an embodiment.
Figure 5B:
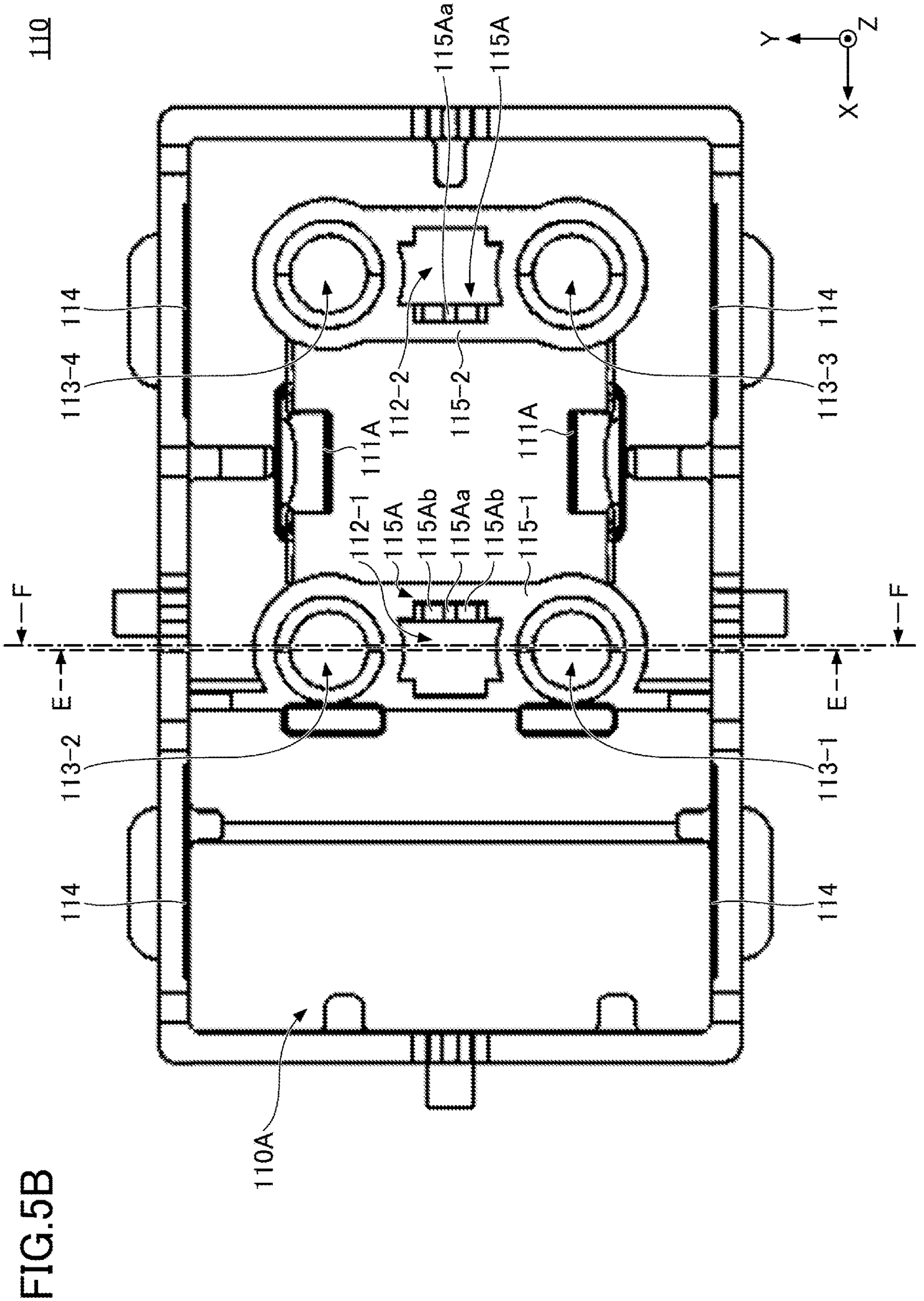
FIG. 5B is a bottom view of a housing of an input device according to an embodiment.
Figure 5C:
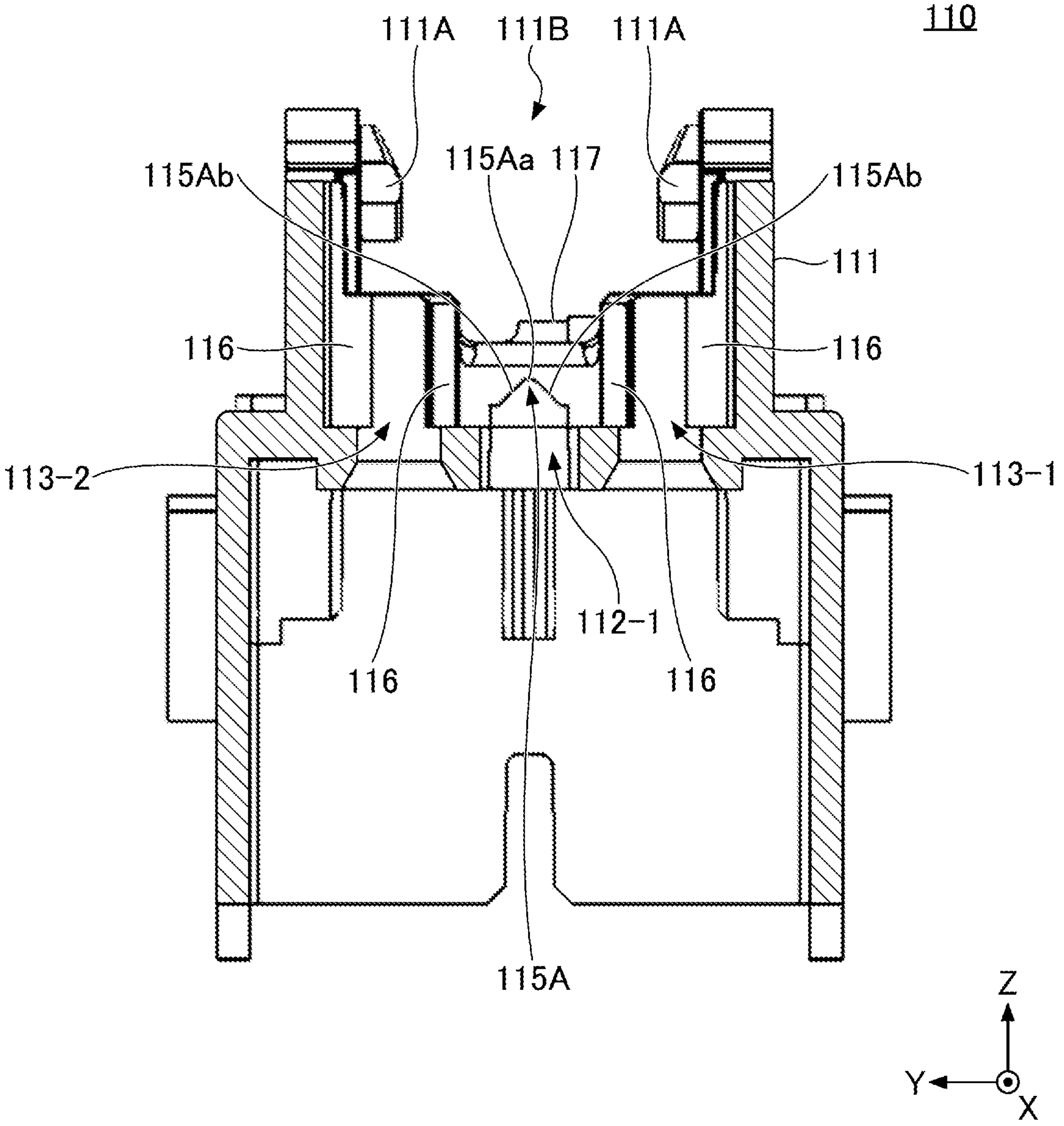
FIG. 5C is a cross-sectional view of a housing of an input device according to an embodiment, taken along a cross-sectioning line E-E indicated in FIG. 5B.
Figure 5D:
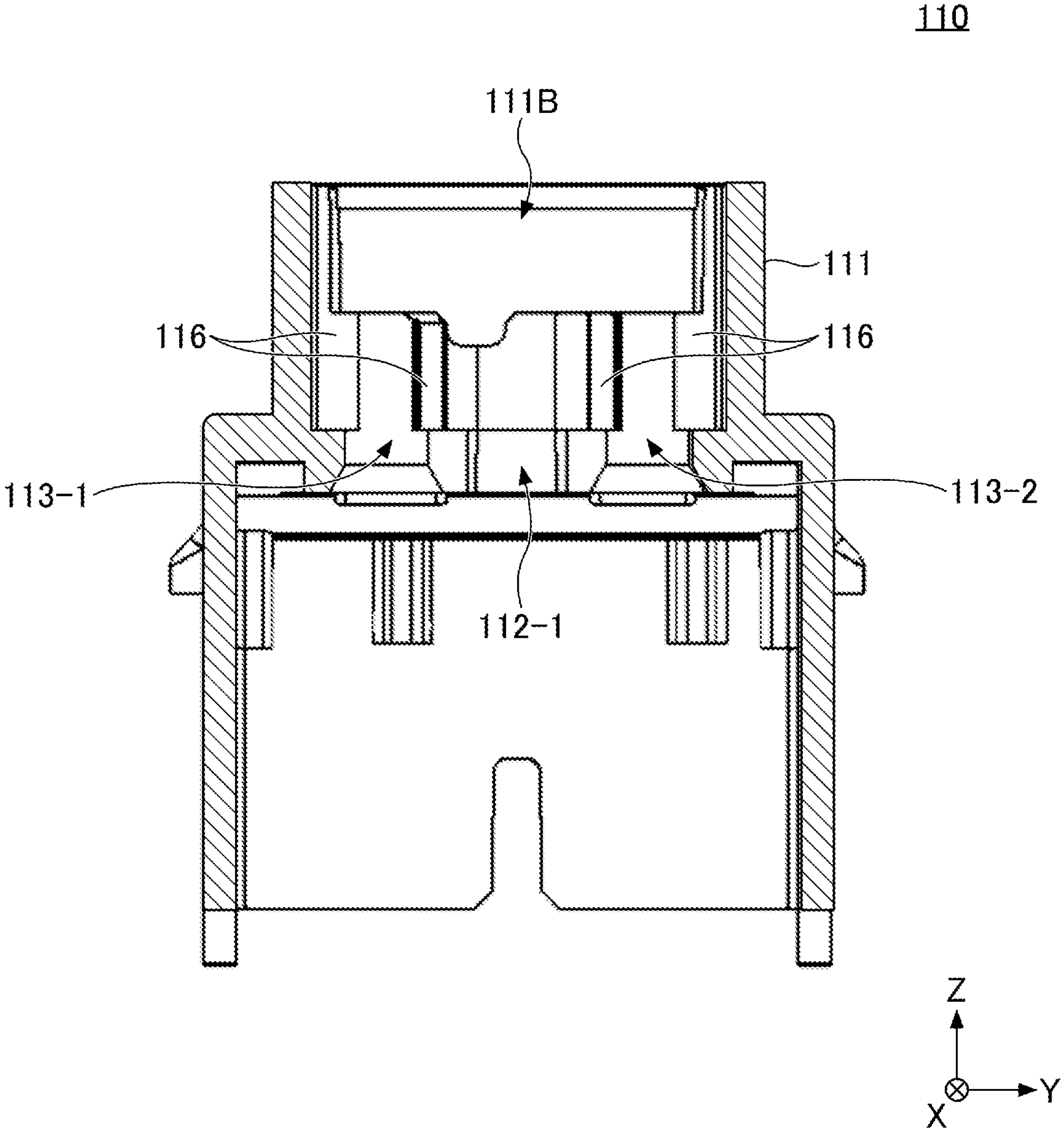
FIG. 5D is a cross-sectional view of a housing of an input device according to an embodiment, taken along a cross-sectioning line F-F indicated in FIG. 5B.
Figure 6:
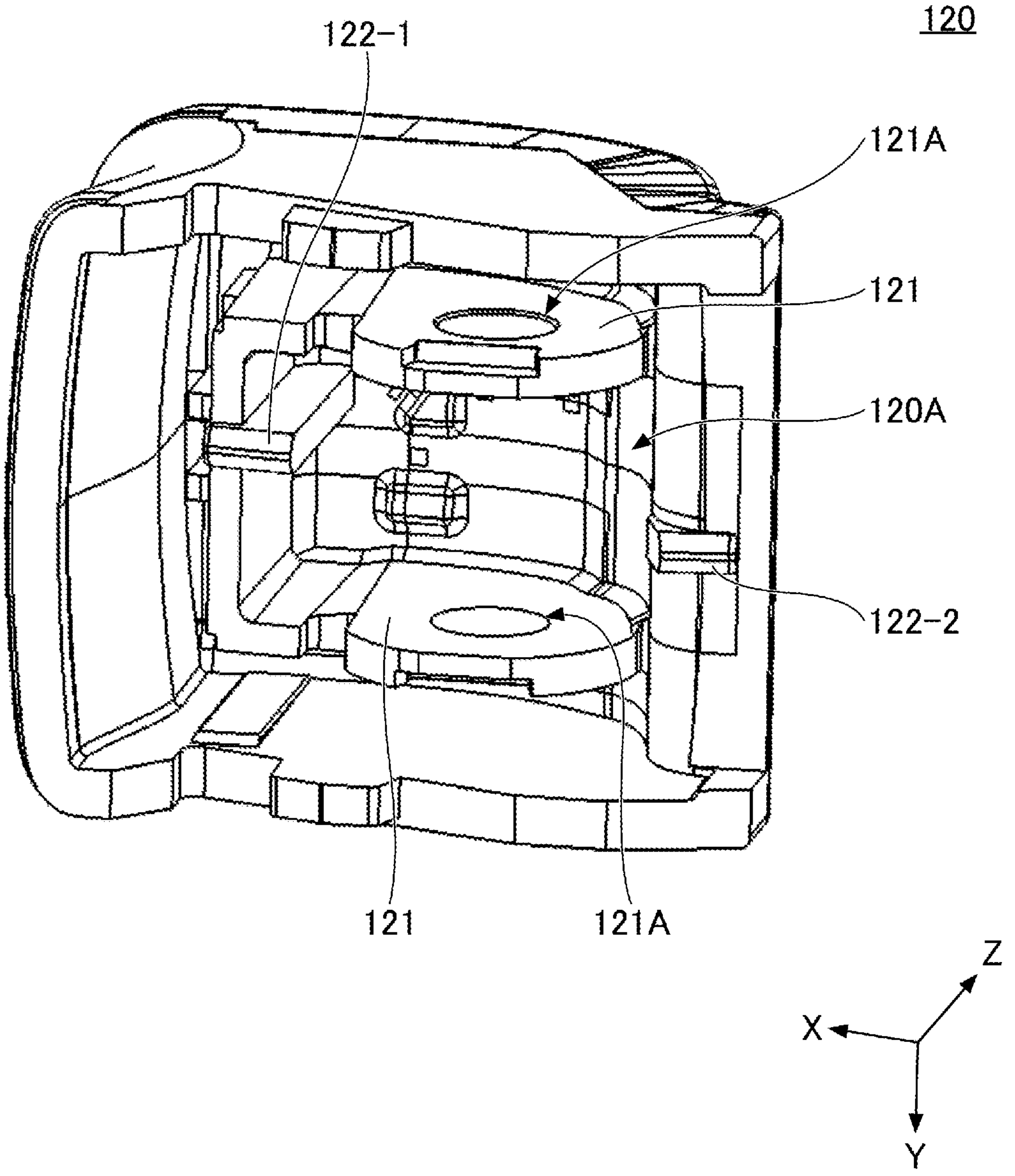
FIG. 6 is an oblique external view of an operation knob of an input device according to an embodiment.

FIG. 3 is an oblique exploded view of the input device 100 according to an embodiment. FIG. 4 and FIG. 5A are oblique external views of the housing 110 of the input device 100 according to an embodiment. FIG. 5B is a bottom view of the housing 110 of the input device 100 according to an embodiment. FIG. 5C is a cross-sectional view of the housing 110 of the input device 100 according to an embodiment, taken along a cross-sectioning line E-E indicated in FIG. 5B. FIG. 5D is a cross-sectional view of the housing 110 of the input device 100 according to an embodiment, taken along a cross-sectioning line F-F indicated in FIG. 5B. FIG. 6 is an oblique external view of the operation knob 120 of the input device 100 according to an embodiment.

As illustrated in FIG. 3, the input device 100 includes the operation knob 120, the housing 110, two cam members 170-1 and 170-2, four actuators 140-1 to 140-4, a rubber sheet 150, a substrate 160, and a cover 130.

<Operation Knob 120>

The operation knob 120 is a member configured to pivot by receiving an input from an operator. The operation knob 120 is situated on top of the housing 110, and is supported pivotally with respect to the housing 110 by being coupled to the upper side (Z-axis positive side) of the housing 110. The operation knob 120 is a resin member configured to receive an operation force from an operator. The operation knob 120 is supported pivotally frontward (in the X-axis positive direction) and rearward (X-axis negative direction) with respect to the housing 110, by bearing holes 121A illustrated in FIG. 6 being coupled on projecting portions 111A of the housing 110 illustrated in FIG. 3. As illustrated in FIG. 6, the operation knob 120 has a hollow structure opened at the bottom. As illustrated in FIG. 6, in an internal space 120A of the operation knob 120, a pair of left and right ribs 121 are situated such that they hang from the ceiling surface of the internal space 120A. The bearing holes 121A having a circular shape are formed in the pair of ribs 121, respectively, such that the bearing holes 121A penetrate the ribs 121 in the left-right direction.

As illustrated in FIG. 6, in the internal space 120A of the operation knob 120, a pushing portion 122-1 is situated in front of (on the X-axis positive side of) the pair of ribs 121 such that the pushing portion 122-1 projects downward from the ceiling surface of the internal space 120A. The pushing portion 122-1 is configured to push the cam member 170-1 situated under the pushing portion 122-1, when an operation to pivot the operation knob 120 frontward (in the X-axis positive direction) is performed. The pushing portion 122-1 is situated at a position that is offset leftward from a left-right direction center of the operation knob 120. The pushing portion 122-1 is a portion configured to transmit an operation force to the cam member 170-1 by pushing the cam member 170-1, when the operation knob 120 pivots.

As illustrated in FIG. 6, in the internal space 120A of the operation knob 120, a pushing portion 122-2 is situated behind (on the X-axis negative side of) the pair of ribs 121 such that the pushing portion 122-2 projects downward from the ceiling surface of the internal space 120A. The pushing portion 122-2 is configured to push the cam member 170-2 situated under the pushing portion 122-2, when an operation to pivot the operation knob 120 rearward (in the X-axis negative direction) is performed. The pushing portion 122-2 is situated at a position that is offset rightward from the left-right direction center of the operation knob 120. The pushing portion 122-2 is a portion configured to transmit an operation force to the cam member 170-2 by pushing the cam member 170-2, when the operation knob 120 pivots.

<Housing 110>

The housing 110 is a resin member having a shape of a container having a hollow structure. The rubber sheet 150, the substrate 160, and the cover 130 are contained in the housing 110. A wall portion 111 having an approximately rectangular barrel-like external shape extending in the upper-lower direction is formed at an upper portion of the housing 110. The wall portion 111 has an upper opening 111B. The upper opening 111B is covered with the operation knob 120 when assembled. The wall portion 111 has the pair of projecting portions 111A that are situated to project from the left and right internal walls, respectively. The projecting portions 111A have a shape conforming to the bearing holes 121A of the operation knob 120, and are situated at positions corresponding to the bearing holes 121A. By the pair of projecting portions 111A being engaged with the pair of bearing holes 121A, respectively, the wall portion 111 is configured to support the operation knob 120 such that the operation knob 120 can pivot in the front-rear direction (X-axis direction).

As illustrated in FIG. 4 and FIGS. 5, the housing 110 includes two beam portions 115 (115-1 and 115-2) in the wall portion 111. The beam portion 115-1 is situated on the front side (X-axis positive side), is supported on the wall portion supporting the operation knob 120, and extends in the left-right direction (Y-axis direction). The beam portion 115-2 is situated on the rear side (X-axis negative side), is supported on the wall supporting the operation knob 120, and extends in the left-right direction (Y-axis direction). The two beam portions 115-1 and 115-2 each have a plate shape, and are elastically deformable in the X-axis direction.

The housing 110 includes two first supporting holes 112-1 and 112-2 in the wall portion 111. The two first supporting holes 112-1 and 112-2 each have an approximately rectangular barrel-like shape in the upper-lower direction defined as the barrel-extending direction. The front first supporting hole 112-1 is partially constituted by the beam portion 115-1, and can change its front-rear direction (X-axis direction) dimension temporarily by conforming to elastic deformation of the beam portion 115-1. The cam member 170-1 has an engaging projection 172, of which the front-rear direction (X-axis direction) dimension is greater than the dimension of the first supporting hole 112-1 before being elastically deformed and is smaller than the dimension of the first supporting hole 112-1 after being elastically deformed. The first supporting hole 112-1 is a hole into which the engaging projection 172 of the front cam member 170-1 is fitted from above when assembling the cam member 170-1 with the housing 110. As illustrated in FIG. 4, a front end portion of the upper portion of the beam portion 115-1, the upper portion constituting the entrance of the first supporting hole 112-1, is provided with a chamfer (snap-in inclination 117) for facilitating fitting of the engaging projection 172 from above. The rear first supporting hole 112-2 is partially constituted by the beam portion 115-2, and can change its front-rear direction (X-axis direction) dimension temporarily by conforming to elastic deformation of the beam portion 115-2. The rear first supporting hole 112-2 is a hole into which the engaging projection 172 of the rear cam member 170-2 is fitted from above. A rear end portion of the upper portion of the beam portion 115-2, the upper portion constituting the entrance of the first supporting hole 112-2, is provided with a chamfer (snap-in inclination 117) for facilitating fitting of the engaging projection 172 from above.

The housing 110 includes four second supporting holes 113-1 to 113-4 in the wall portion 111. The four second supporting holes 113-1 to 113-4 each have an approximately cylinder-like shape in the upper-lower direction defined as the cylinder-extending direction. The front two second supporting holes 113-1 and 113-2 are provided in the beam portion 115-1 such that they are arranged alongside each other in the left-right direction with the first supporting hole 112-1 interposed therebetween. The front two second supporting holes 113-1 and 113-2 are configured to support the front two actuators 140-1 and 140-2, by shaft portions 141 of the front two actuators 140-1 and 140-2 being inserted into the front two second supporting holes 113-1 and 113-2 from below, respectively. The rear two second supporting holes 113-3 and 113-4 are provided in the beam portion 115-2 such that they are arranged alongside each other in the left-right direction with the first supporting hole 112-2 interposed therebetween. The rear two second supporting holes 113-3 and 113-4 are configured to support the rear two actuators 140-3 and 140-4, by shaft portions 141 of the rear two actuators 140-3 and 140-4 being inserted into the rear two second supporting holes 113-3 and 113-4 from below, respectively. The second supporting holes 113 are partially constituted by guide portions 118 illustrated in FIG. 4. The guide portions 118 have a shape by which the guide portions 118 support the shaft portions 141 of the actuators 140 such that the shaft portions 141 can slide upward and downward. Moreover, the guide portions 118 are portions situated under main body portions 171 of the cam members 170 after the housing 110 and the cam members 170 are assembled with each other.

<Actuators 140-1 to 140-4>

The four actuators 140-1 to 140-4 are supported by the housing 110 such that they can slide in a direction (upper-lower direction) perpendicular to the substrate. The four actuators 140-1 to 140-4 are situated on top of four dome portions 152-1 to 152-4 of the rubber sheet 150, respectively. The four actuators 140-1 to 140-4 are each a resin member including: the shaft portion 141 having a circular column-like shape and extending in the upper-lower direction (Z-axis direction); and a pushing portion having a horizontal disk-like shape. The pushing portion 142 is situated on the lower end portion of the shaft portion 141. The four actuators 140-1 to 140-4 are pushed downward by the cam member 170-1 or the cam member 170-2, respectively, when an operation to rotate the operation knob 120 is performed. Hence, the four actuators 140-1 to 140-4 slide downward, and the bottom surfaces of the pushing portions 142 push the dome portions 152 of the rubber sheet 150 situated under the pushing portions 142.

The actuator 140-1 is configured to slide toward a first switch (the dome portion 152-1 and a fixed contact point 161-1) and push the first switch in conjunction with a first movement of the cam member 170-1. The actuator 140-1 is an example of the "first actuator".

The actuator 140-2 is configured to slide toward a second switch (the dome portion 152-2 and a fixed contact point 161-2) and push the second switch in conjunction with a second movement, the second movement being performed in addition to a first movement of the cam member 170-1 when another operation force is applied after the first movement is completed. The actuator 140-2 is an example of the "second actuator".

The actuator 140-3 is configured to slide toward a second switch (the dome portion 152-3 and a fixed contact point 161-3) and push the second switch in conjunction with a second movement performed in addition to a first movement of the cam member 170-2 when another operation force is applied after the first movement is completed. The actuator 140-3 is an example of the "second actuator".

The actuator 140-4 is configured to slide toward a first switch (the dome portion 152-4 and a fixed contact point 161-4) and push the first switch in conjunction with a first movement of the cam member 170-2. The actuator 140-4 is an example of the "first actuator".

<Cam Member 170-1>

The cam member 170-1 is a resin member situated on the front side (X-axis positive side) in the housing 110 and supported by the housing 110 such that the cam member 170-1 can slide in the upper-lower direction and swing in the left-right direction. The cam member 170-1 includes the main body portion 171 having a shape longer in the left-right direction (Y-axis direction). The main body portion 171 is situated over the front two actuators 140-1 and 140-2. The main body portion 171 is situated such that it spans the tops of the two actuators 140-1 and 140-2. The engaging projection 172 is situated on the left-right direction center of the bottom surface of the main body portion 171 such that the engaging projection 172 projects downward.

The cam member 170-1 is supported by the housing 110, by the engaging projection 172 being fitted into the front first supporting hole 112-1 provided in the housing 110 from above. When the operation knob 120 is pivotally operated frontward (in the X-axis positive direction), a position on the cam member 170-1 is pushed by the lower end portion of the front pushing portion 122-1 of the operation knob 120, the position on the cam member 170-1 being a position offset to the left direction on the upper surface of the main body portion 171.

Figure 13:
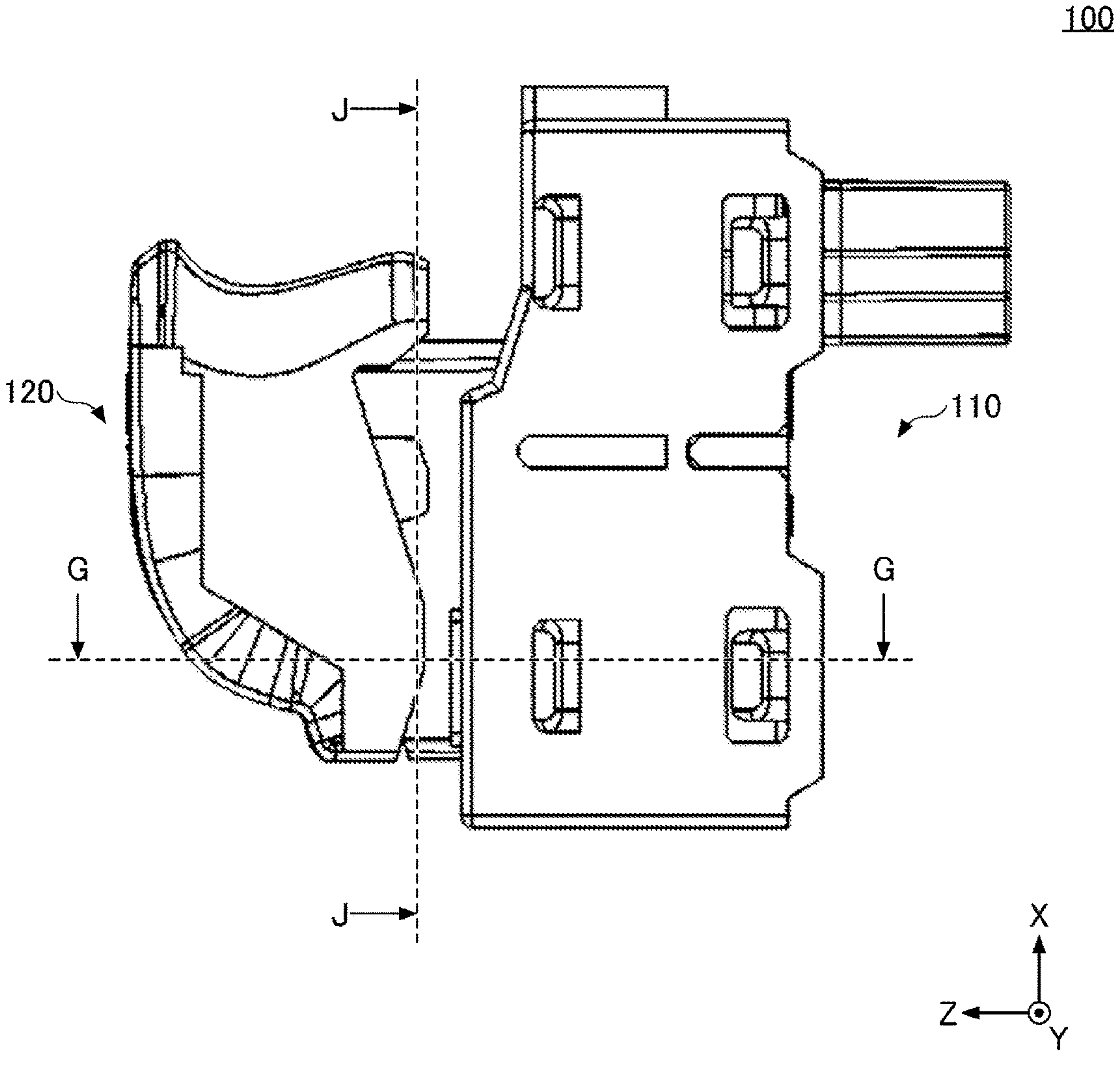
FIG. 13 is a side view of an input device according to an embodiment in a non-operated state.
Figure 17:
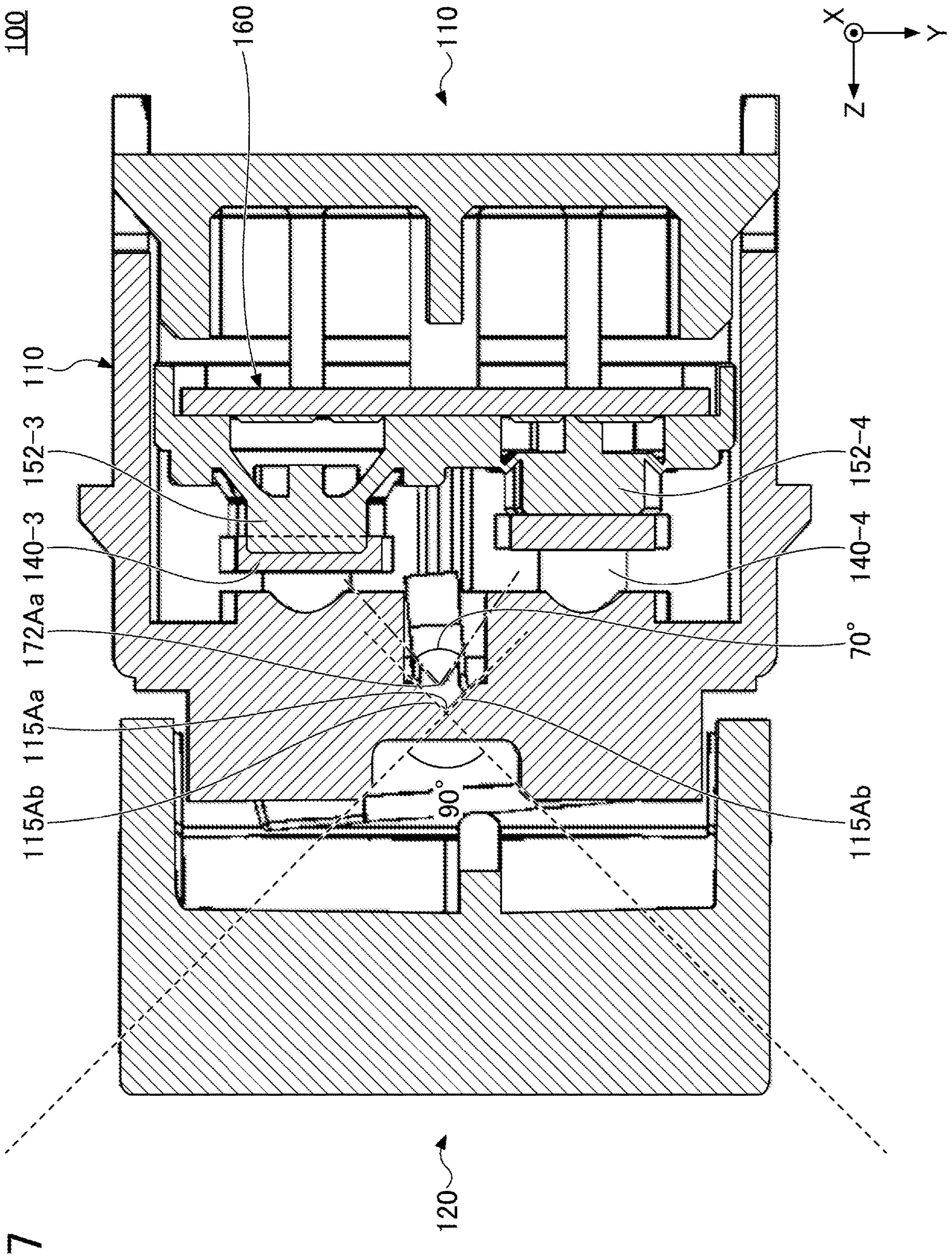
FIG. 17 is a cross-sectional view illustrating positioning of a lock portion and a swinging fulcrum of an input device according to an embodiment in a state in which an operation knob has pivoted to an end of a first angular range, taken along a cross-sectioning line H-H indicated in FIG. 14.

When the operation amount of an operation to pivot the operation knob 120 frontward (X-axis positive direction) is in a predetermined first angular range, the cam member 170-1 swings leftward and pushes the left actuator 140-1 downward as the first movement. The actuator 140-1 pushed downward by the cam member 170-1 pushes the left dome portion 152-1 downward and elastically deforms it. Hence, the left fixed contact point 161-1 enters a conductive state. In the present embodiment, the first angular range is an angular range greater than an angle (0°) [deg] of the operation knob 120, which is in a non-operated state as having completed automatic restoration as illustrated in FIG. 13, and less than or equal to an angle (7)° [deg] of the operation knob 120 illustrated in FIG. 14. The first angular range includes angles θ that are greater than 0° [deg] and less than or equal to 7° [deg]. When the operation knob 120 pivots frontward (X-axis positive direction) by 7° [deg], the left fixed contact point 161-1 of the two fixed contact points 161 arranged alongside each other in the left-right direction enters a conductive state as illustrated in FIG. 17.

Figure 18:
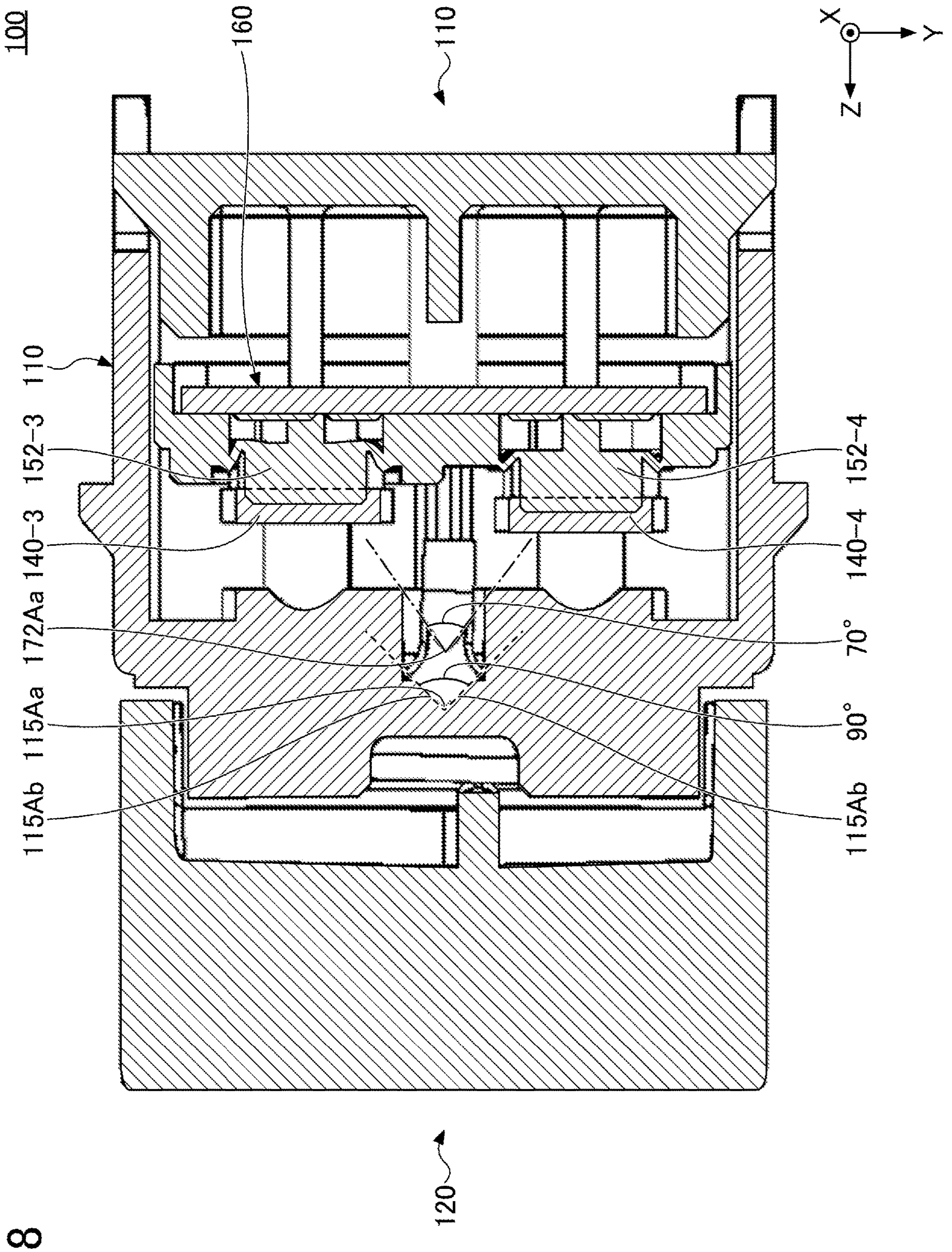
FIG. 18 is a cross-sectional view illustrating positioning of a lock portion and a swinging fulcrum of an input device according to an embodiment in a state in which an operation knob has pivoted to an end of a second angular range, taken along a cross-sectioning line I-I indicated in FIG. 15.

When the operation amount of an operation to pivot the operation knob 120 frontward (X-axis positive direction) is in a predetermined second angular range (>first angular range), the cam member 170-1 swings rightward while keeping the left actuator 140-1 pushed downward to come into a horizontal state and also push the right actuator 140-2 downward, as the second movement. The actuator 140-2 pushed downward by the cam member 170-1 pushes the right dome portion 152-2 downward and elastically deforms it. Hence, the right fixed contact point 161-2 enters a conductive state. In the present embodiment, the second angular range is an angular range greater than the angle (7)° [deg] of the operation knob 120 illustrated in FIG. 14 and less than or equal to an angle (14)° [deg] of the operation knob 120 illustrated in FIG. 15. The second angular range includes angles θ that are greater than 7° [deg] and less than or equal to 14° [deg]. When the operation knob 120 pivots frontward (X-axis positive direction) by 14° [deg], both of the two fixed contact points 161-1 and 161-2 arranged alongside each other in the left-right direction enter a conductive state as illustrated in FIG. 18.

Here, the actuators 140-1 and 140-2 are supported slidably in the upper-lower direction. Hence, by being pushed downward by the cam member 170-1, the actuators 140-1 and 140-2 can push the dome portions 152-1 and 152-2 straightly downward.

When the operation causing the operation knob 120 to pivot frontward (X-axis positive direction) is ceased, the cam member 170-1 and the operation knob 120 are restored to a neutral state by the restoring forces from the two dome portions 152-1 and 152-2.

<Cam Member 170-2>

The cam member 170-2 is a resin member situated on the rear side (X-axis negative side) in the housing 110 and supported by the housing 110 such that the cam member 170-2 can slide in the upper-lower direction and swing in the left-right direction. The cam member 170-2 includes the main body portion 171 having a shape longer in the left-right direction (Y-axis direction). The main body portion 171 is situated above the rear two actuators 140-3 and 140-4. The main body portion 171 is situated such that it spans the tops of the two actuators 140-3 and 140-4. The engaging projection 172 is situated on the left-right direction center of the bottom surface of the main body portion 171 such that the engaging projection 172 projects downward.

The cam member 170-2 is supported by the housing 110, by the engaging projection 172 being fitted into the rear first supporting hole 112-2 provided in the housing 110 from above. When the operation knob 120 is pivotally operated rearward (in the X-axis negative direction), a position on the cam member 170-2 is pushed by the lower end portion of the rear pushing portion 122-2 of the operation knob 120, the position on the cam member 170-2 being a position offset to the right direction on the upper surface of the main body portion 171.

When the operation amount of an operation to pivot the operation knob 120 rearward (X-axis negative direction) is in a predetermined first angular range, the cam member 170-2 swings rightward and pushes the right actuator 140-4 downward as the first movement. The actuator 140-4 pushed downward by the cam member 170-2 pushes the right dome portion 152-4 downward and elastically deforms it. Hence, the right fixed contact point 161-4 enters a conductive state. In the present embodiment, the first angular range includes angles θ that are greater than 0° [deg] and less than or equal to 7° [deg]. When the operation knob 120 pivots rearward (X-axis negative direction) by 7° [deg], the right fixed contact point 161-4 of the two fixed contact points 161 arranged alongside each other in the left-right direction enters a conductive state.

When the operation amount of an operation to pivot the operation knob 120 rearward (X-axis negative direction) is in a predetermined second angular range (>first angular range), the cam member 170-2 swings leftward while keeping the right actuator 140-4 pushed downward to come into a horizontal state and also push the left actuator 140-3 downward, as the second movement. The actuator 140-3 pushed downward by the cam member 170-2 pushes the left dome portion 152-3 downward and elastically deforms it. Hence, the left fixed contact point 161-3 enters a conductive state. In the present embodiment, the second angular range includes angles θ that are greater than 7° [deg] and less than or equal to 14° [deg]. When the operation knob 120 pivots rearward (X-axis negative direction) by 14° [deg], both of the two fixed contact points 161-3 and 161-4 arranged alongside each other in the left-right direction enter a conductive state.

Here, the actuators 140-3 and 140-4 are supported slidably in the upper-lower direction. Hence, by being pushed downward by the cam member 170-2, the actuators 140-3 and 140-4 can push the dome portions 152-3 and 152-4 straightly downward.

When the operation knob 120 is released from the operation to pivot rearward (X-axis negative direction), the cam member 170-2 and the operation knob 120 are restored to a neutral state by the restoring forces from the two dome portions 152-3 and 152-4.

<Substrate 160>

The substrate 160 is a hard, flat plate-shaped resin member. The substrate 160 is placed on an upper surface 130A of the cover 130 in the housing 110, and is situated in parallel with the XY plane direction. As the substrate 160, for example, a Printed Wiring Board (PWB) is used.

The four fixed contact points 161-1 to 161-4 are arranged on an upper surface 160A of the substrate 160 in a 2×2 matrix formation. The four fixed contact points 161-1 to 161-4 each have a roughly circular shape when seen in a plane view in the Z-axis direction. The four fixed contact points 161-1 to 161-4 are each made of a thin plate-shaped conductive metal material (e.g., a copper film).

<Rubber Sheet 150>

The rubber sheet 150 is a flat plate-shaped member made of an elastic material (e.g., silicone and rubber). The rubber sheet 150 covers the substrate 160 and is situated in parallel with the XY plane direction in the housing 110. The rubber sheet 150 is configured to protect the substrate 160 from, for example, water droplets. The rubber sheet 150 includes a base portion 151 and the four dome portions 152-1 to 152-4.

The base portion 151 is a horizontal, flat plate-shaped portion, and has a rectangular shape when seen in a plan view in the Z-axis direction. The base portion 151 supports the four dome portions 152-1 to 152-4.

The four dome portions 152-1 to 152-4 each have a dome shape projecting upward from an upper surface 151A of the base portion 151. When seen in a plan view, the four dome portions 152-1 to 152-4 are situated at positions at which they coincide with the four fixed contact points 161-1 to 161-4 provided on the substrate 160, respectively. That is, the four dome portions 152-1 to 152-4 are arranged on the rubber sheet 150 in a 2×2 matrix formation.

Movable contact points (non-illustrated) are situated on lower (Z-axis negative side) surfaces of the four dome portions 152-1 to 152-4, respectively. When the operation knob 120 is pivotally operated, the four dome portions 152-1 to 152-4 bend (elastically deform) downward (in the Z-axis negative direction) and contact the fixed contact points 161 situated under (on the Z-axis negative side of) the dome portions 152, respectively, by being pushed downward by the actuators 140 situated over (on the Z-axis positive side of) the dome portions 152. Hence, the fixed contact points 161 and the movable contact points contact and enter a conductive state. The dome portions 152 have a restoring force, and are restored to the initial state when freed from an operation force.

Together with the fixed contact point 161-1, the dome portion 152-1 constitutes "a first switch" and "a rubber dome switch", which are switched on in conjunction with the first movement of the cam member 170-1. Together with the fixed contact point 161-2, the dome portion 152-2 constitutes "a second switch" and "a rubber dome switch", which are switched on in conjunction with the second movement of the cam member 170-1.

Together with the fixed contact point 161-3, the dome portion 152-3 constitutes "a second switch" and "a rubber dome switch", which are switched on in conjunction with the second movement of the cam member 170-2. Together with the fixed contact point 161-4, the dome portion 152-4 constitutes "a first switch" and "a rubber dome switch", which are switched on in conjunction with the first movement of the cam member 170-2.

The "first switch" and the "second switch" are not limited to "rubber dome switches", and may be another type of switches (e.g., metal contact switches).

<Cover 130>

The cover 130 is a resin member configured to close a lower opening portion 110A of the housing 110 by being fitted into the lower opening portion 110A. The cover 130 has a roughly rectangular parallelepiped shape. The substrate 160 is placed on the upper surface 130A of the cover 130. A plurality of engaging claws 131 are situated on the side surface of the cover 130. The cover 130 is fixed on the housing 110 by the plurality of engaging claws 131 being engaged with a plurality of opening portions 114 formed in the side surface of the housing 110.

(Detailed Configuration of Cam Members 170-1 and 170-2)

Figure 7A:
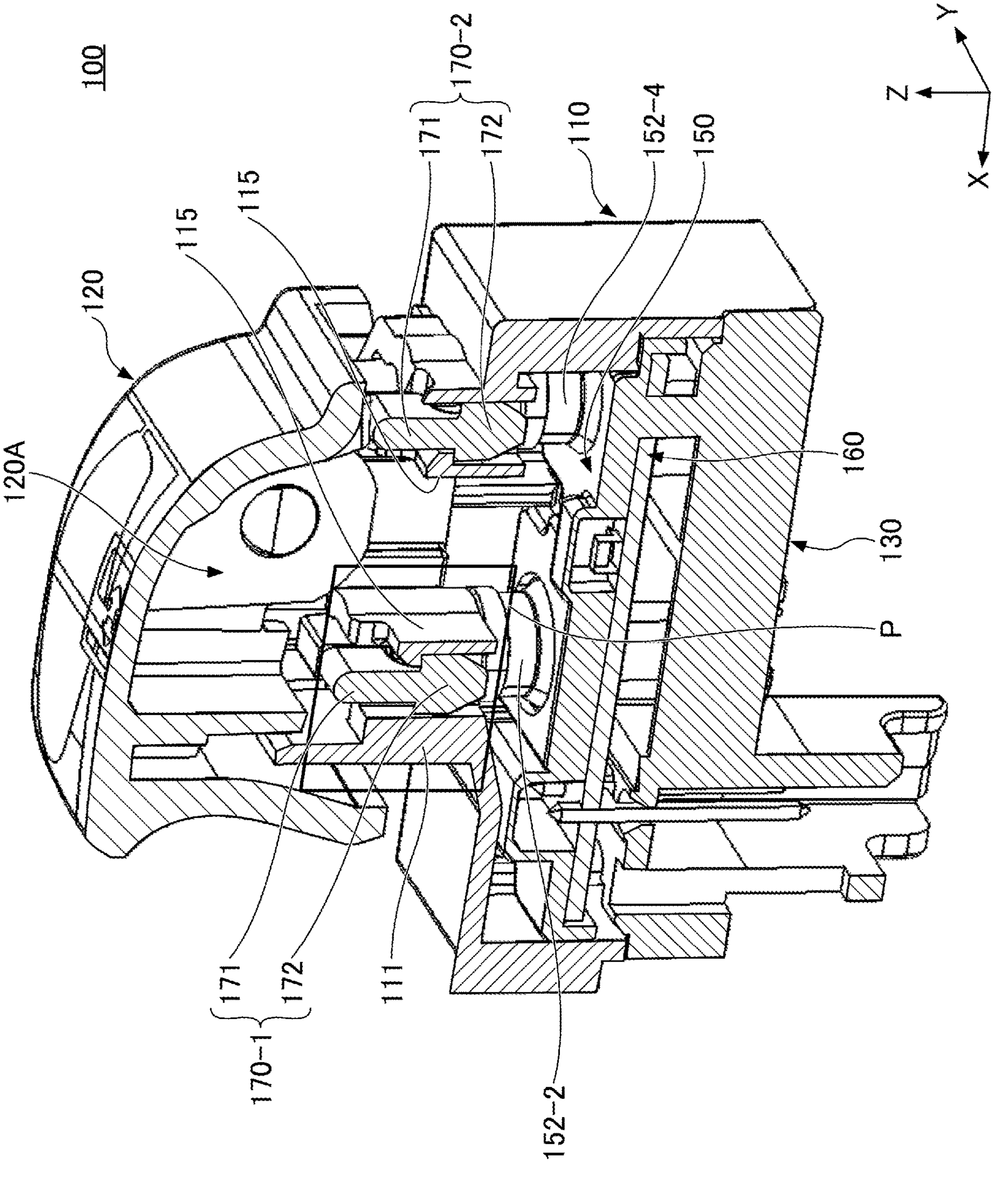
FIG. 7A is an oblique cross-sectional view illustrating a cross-section of an input device according to an embodiment along a cross-sectioning line A-A indicated in FIG. 2.
Figure 7B:
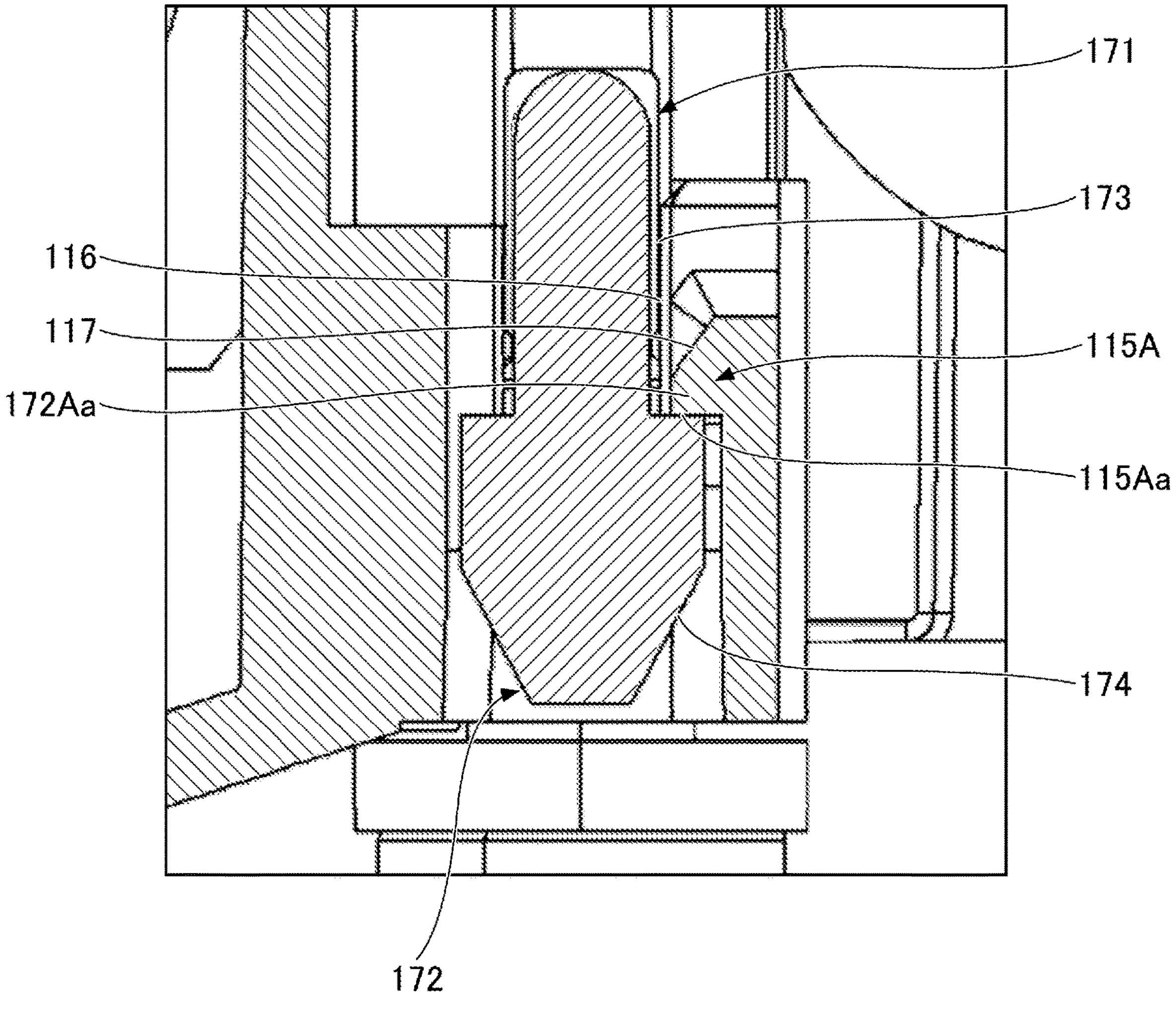
FIG. 7B is an enlarged view of a portion P illustrated in FIG. 7A.
Figure 8:
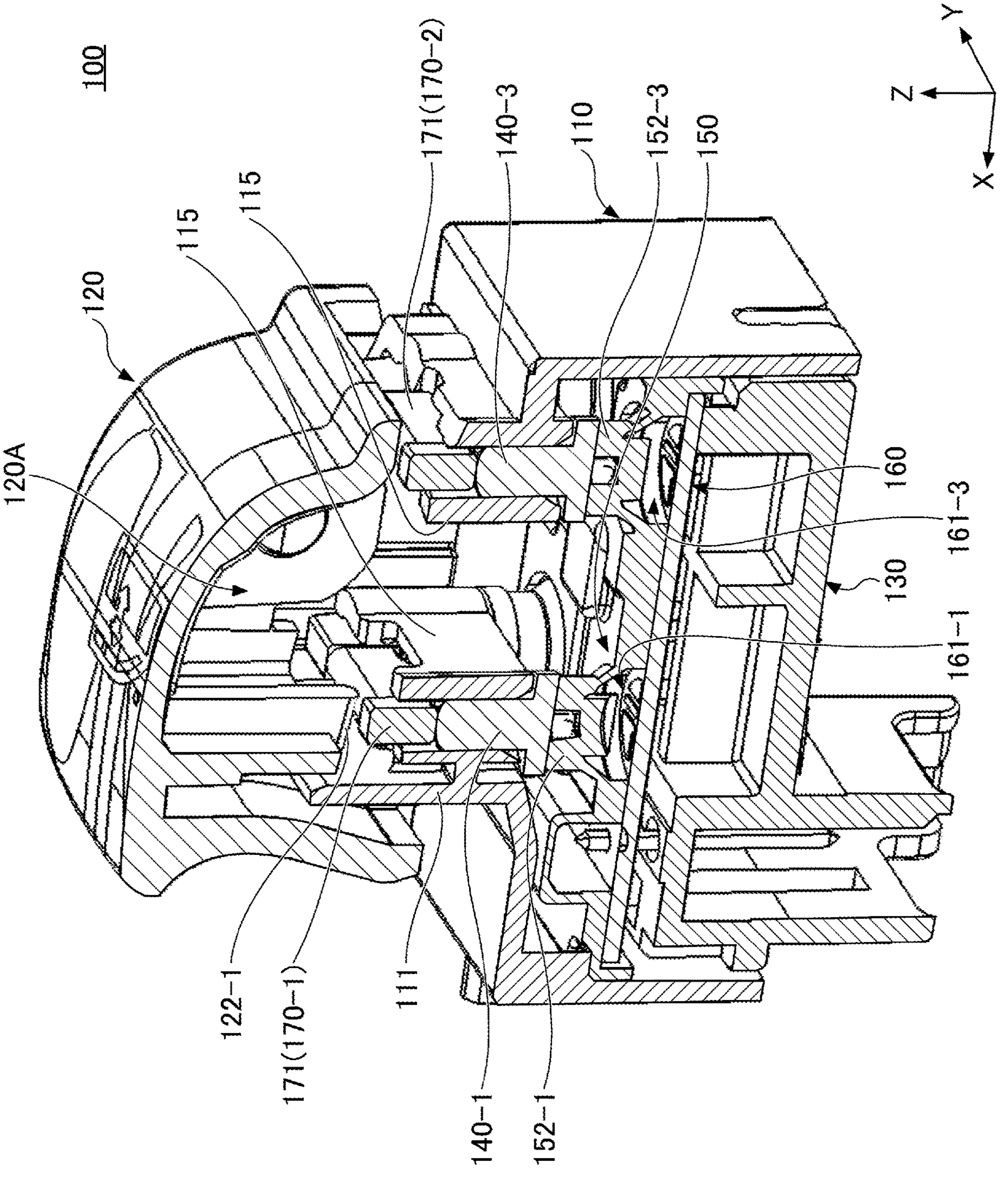
FIG. 8 is an oblique cross-sectional view illustrating a cross-section of an input device according to an embodiment along a cross-sectioning line B-B indicated in FIG. 2.
Figure 9:
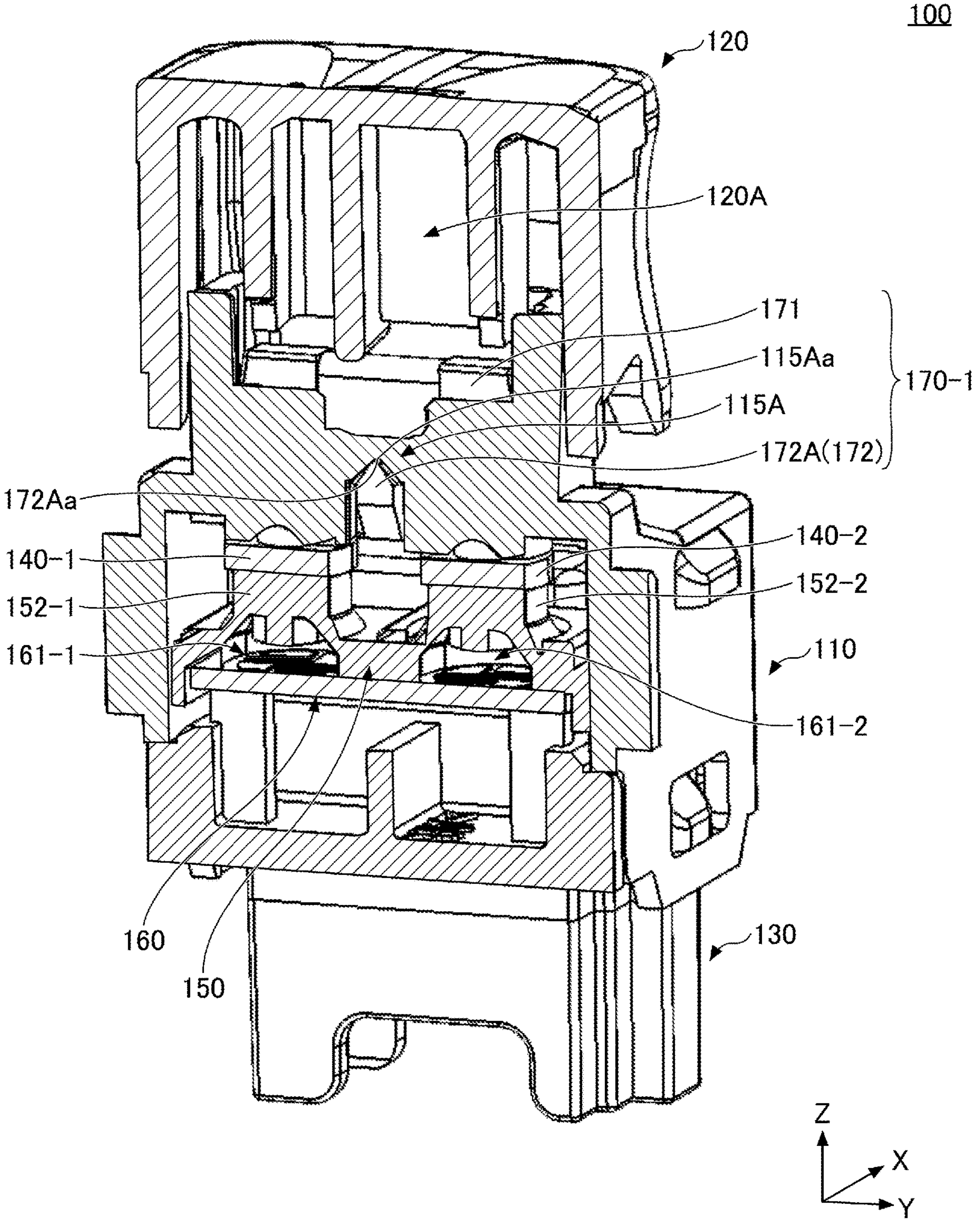
FIG. 9 is an oblique cross-sectional view illustrating a cross-section of an input device according to an embodiment along a cross-sectioning line C-C indicated in FIG. 2.
Figure 10:
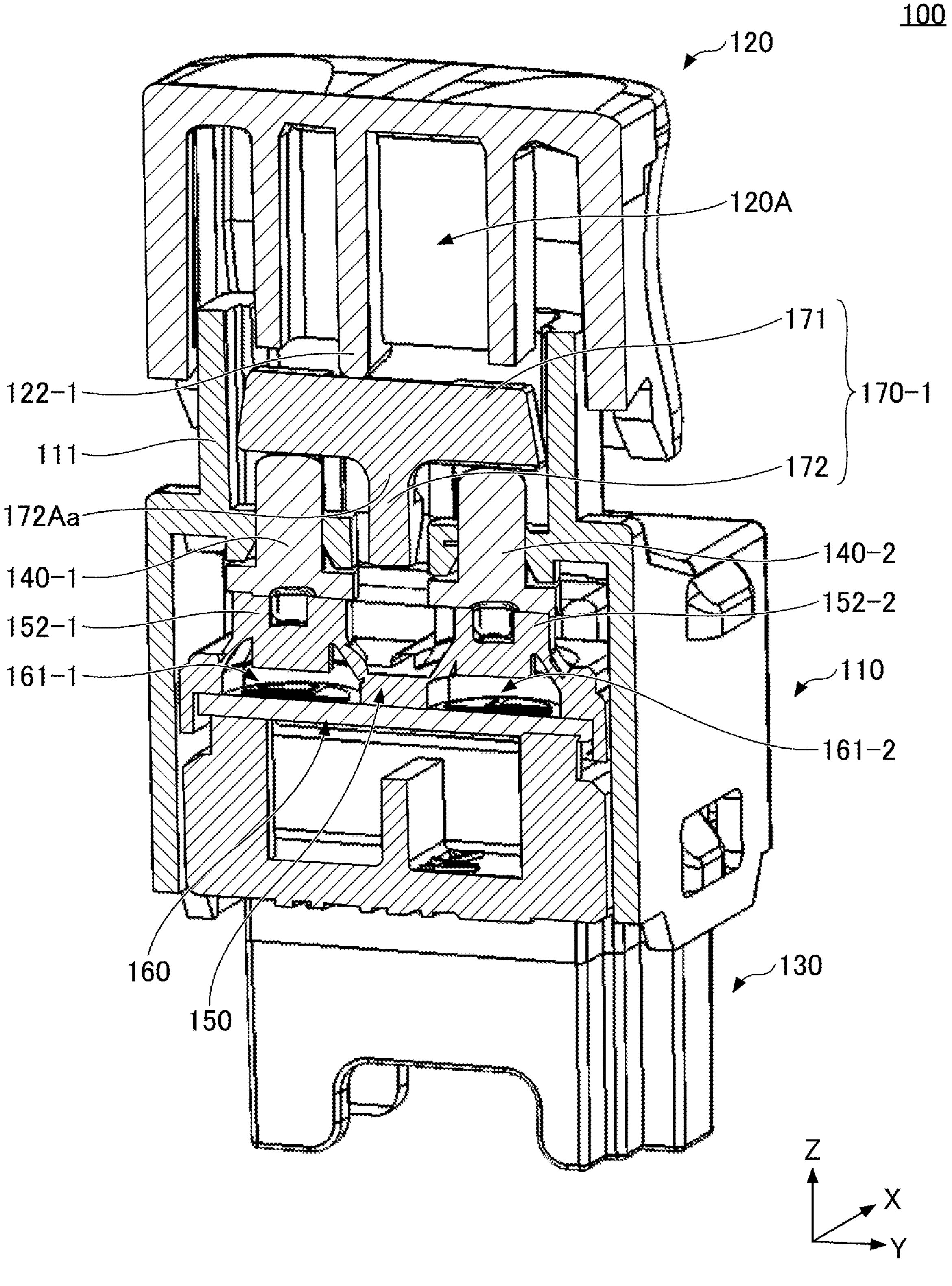
FIG. 10 is an oblique cross-sectional view illustrating a cross-section of an input device according to an embodiment along a cross-sectioning line D-D illustrated in FIG. 2.
Figure 11A:
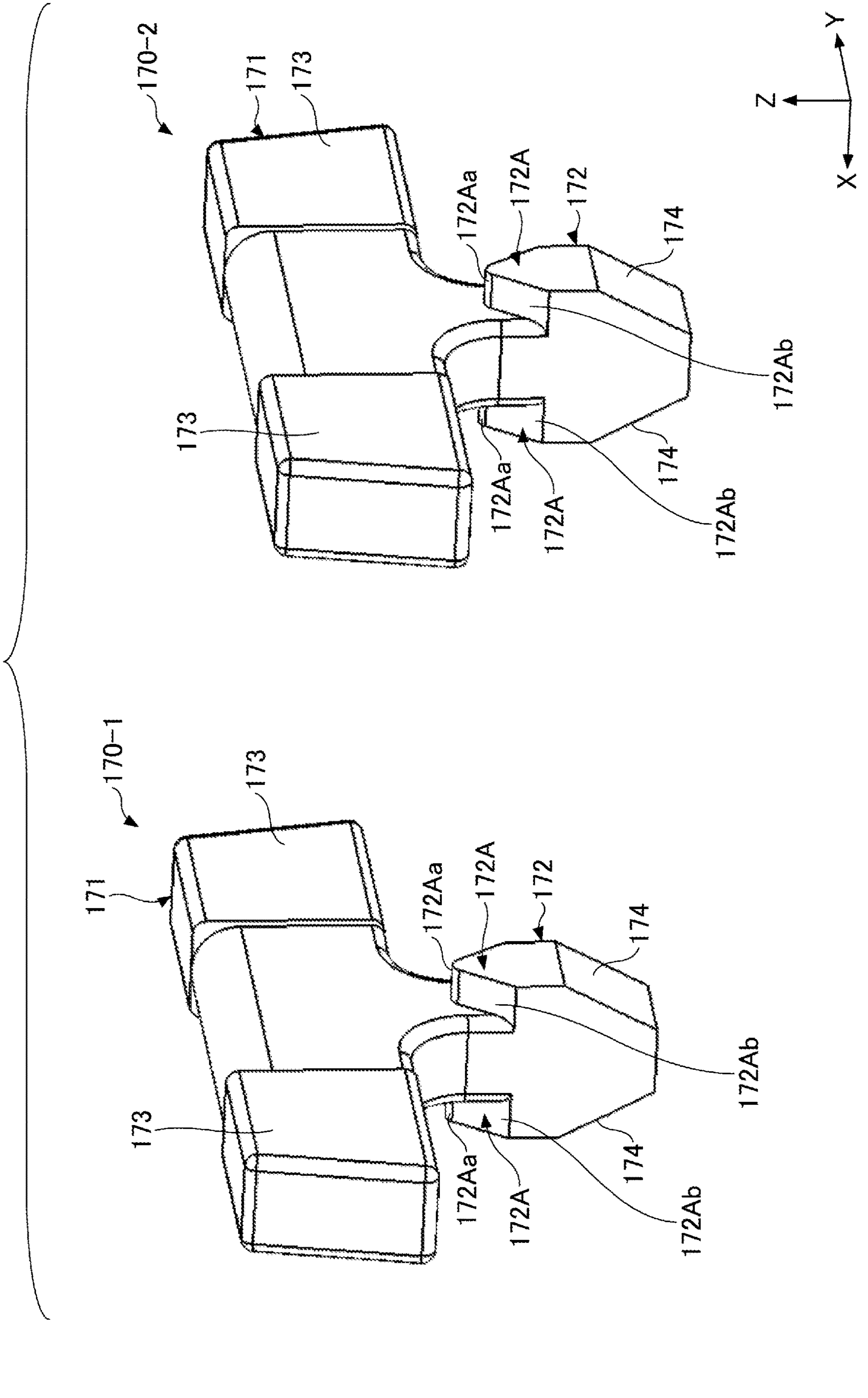
FIG. 11A is an oblique external view of cam members of an input device according to an embodiment.
Figure 11B:
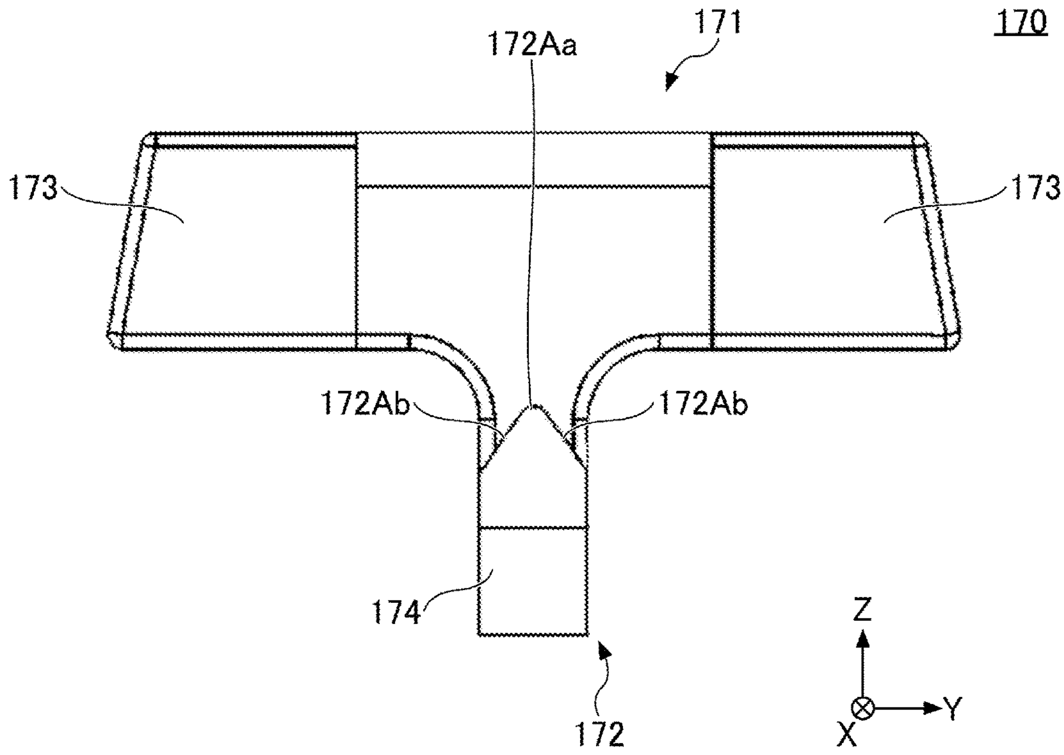
FIG. 11B is a view of a cam member of an input device according to an embodiment, seen in a pivoting direction (X-axis direction) in which an operation knob pivots.
Figure 11C:
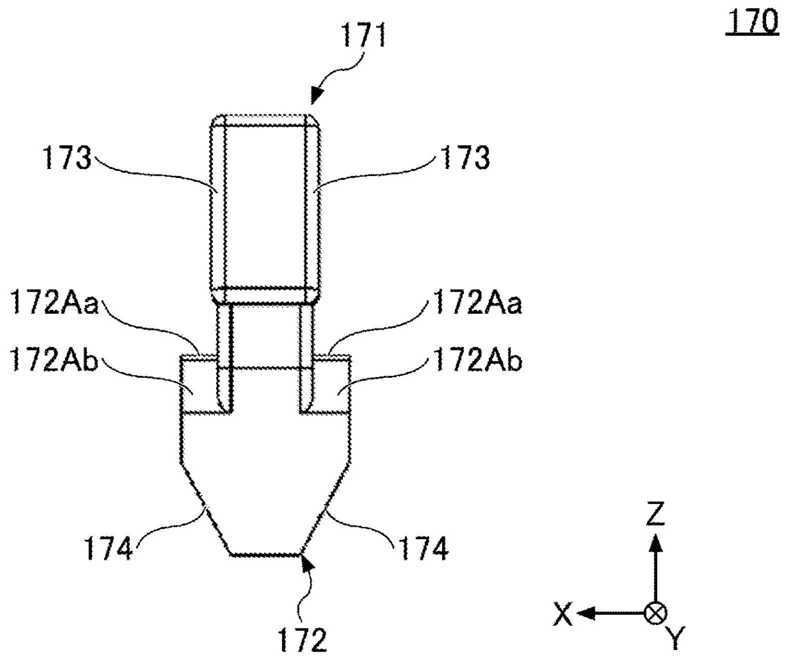
FIG. 11C is a view of a cam member of an input device according to an embodiment, seen in a direction (Y-axis direction) intersecting with a pivoting direction.
Figure 11D:
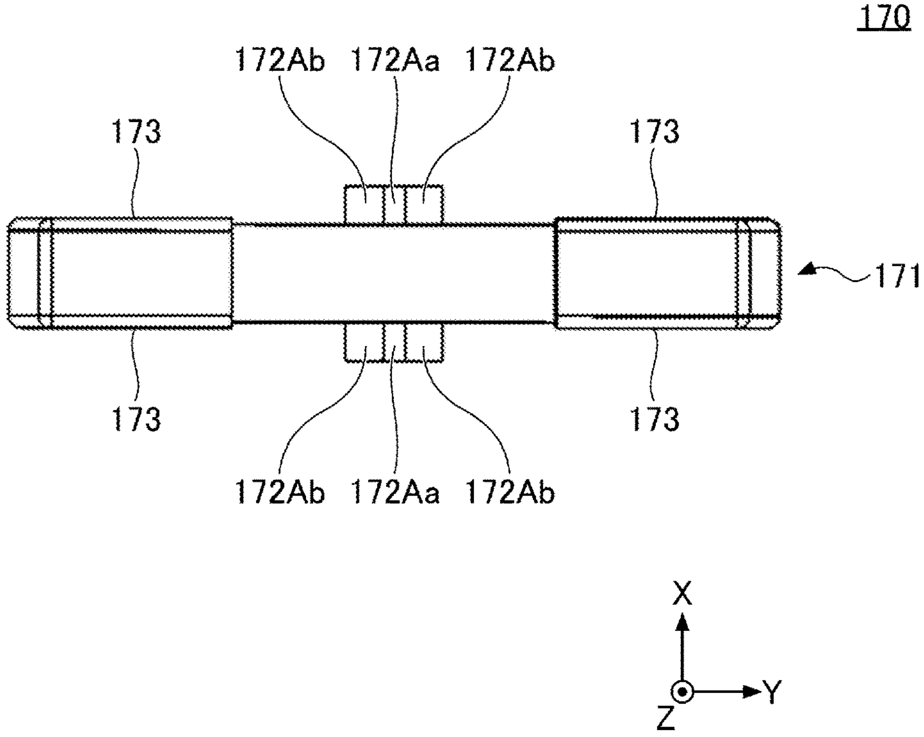
FIG. 11D is a top view of a cam member of an input device according to an embodiment.
Figure 11E:
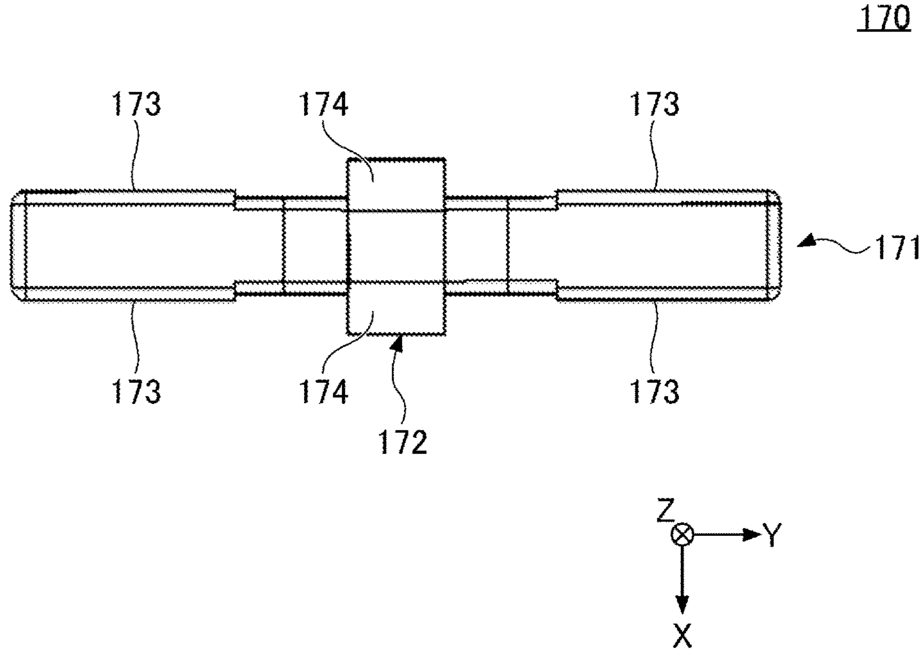
FIG. 11E is a bottom view of a cam member of an input device according to an embodiment.
Figure 14:
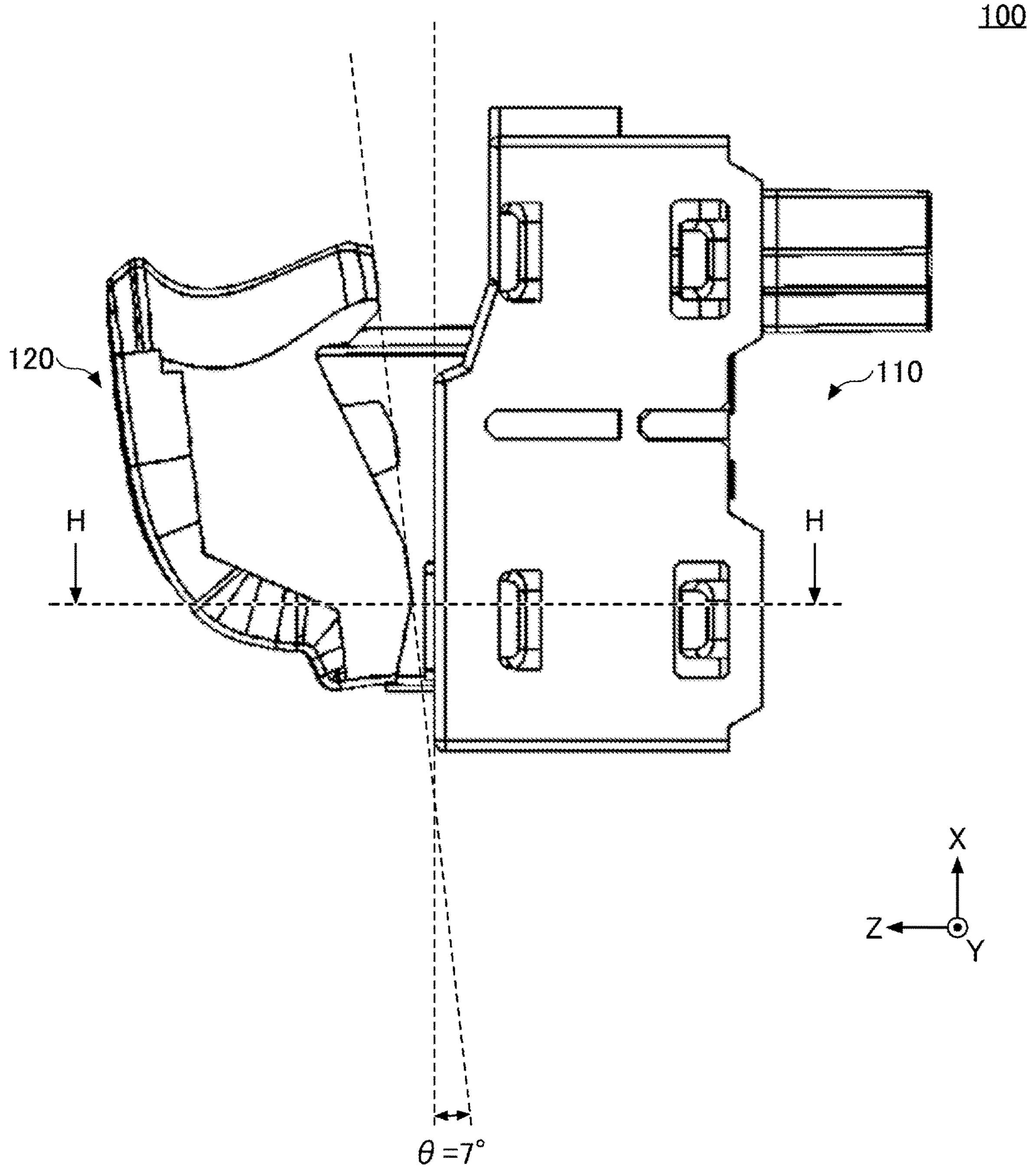
FIG. 14 is a side view of an input device according to an embodiment in a state in which an operation knob has pivoted to an end of a first angular range.
Figure 15:
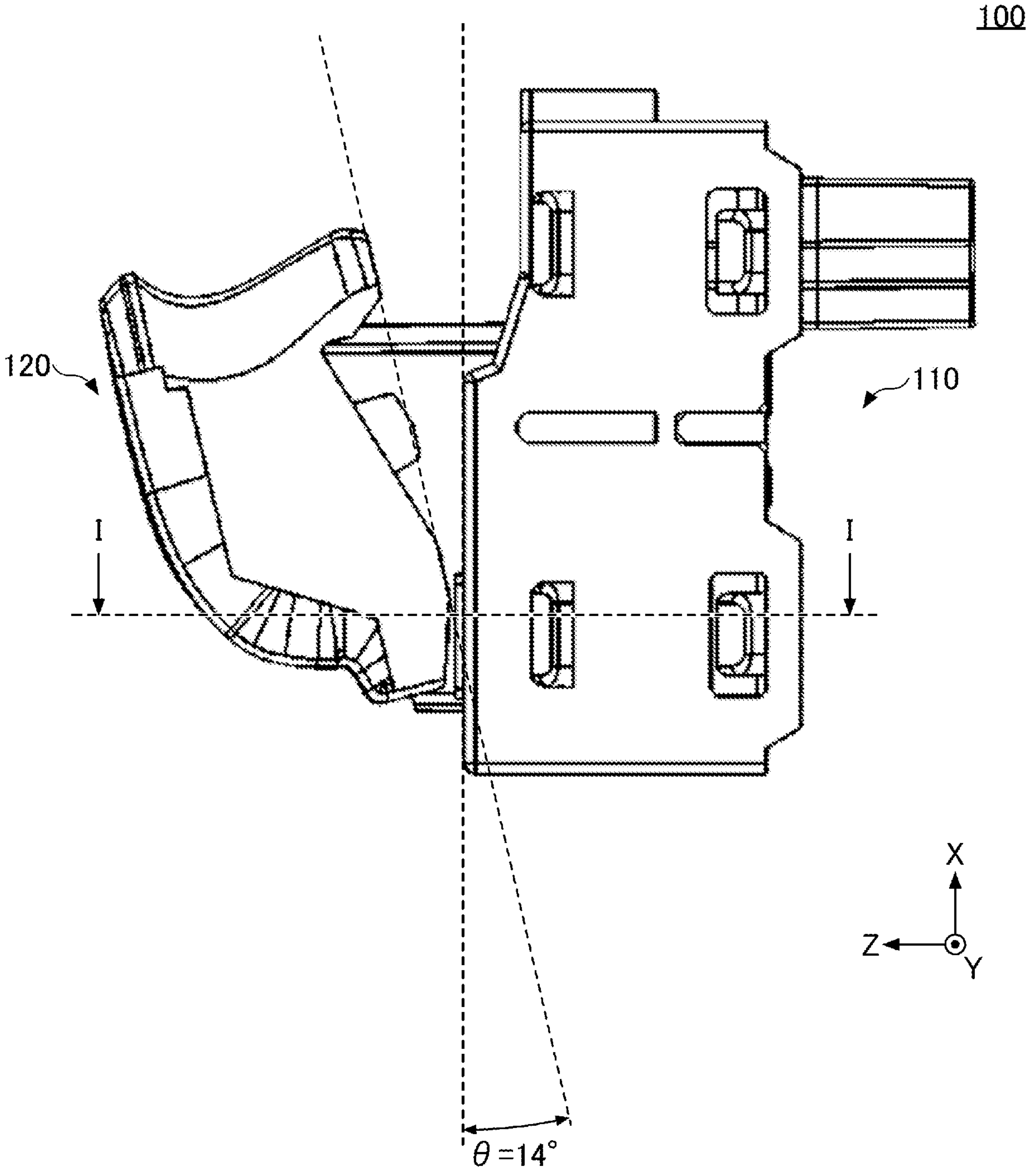
FIG. 15 is a side view of an input device according to an embodiment in a state in which an operation knob has pivoted to an end of a second angular range.
Figure 16:
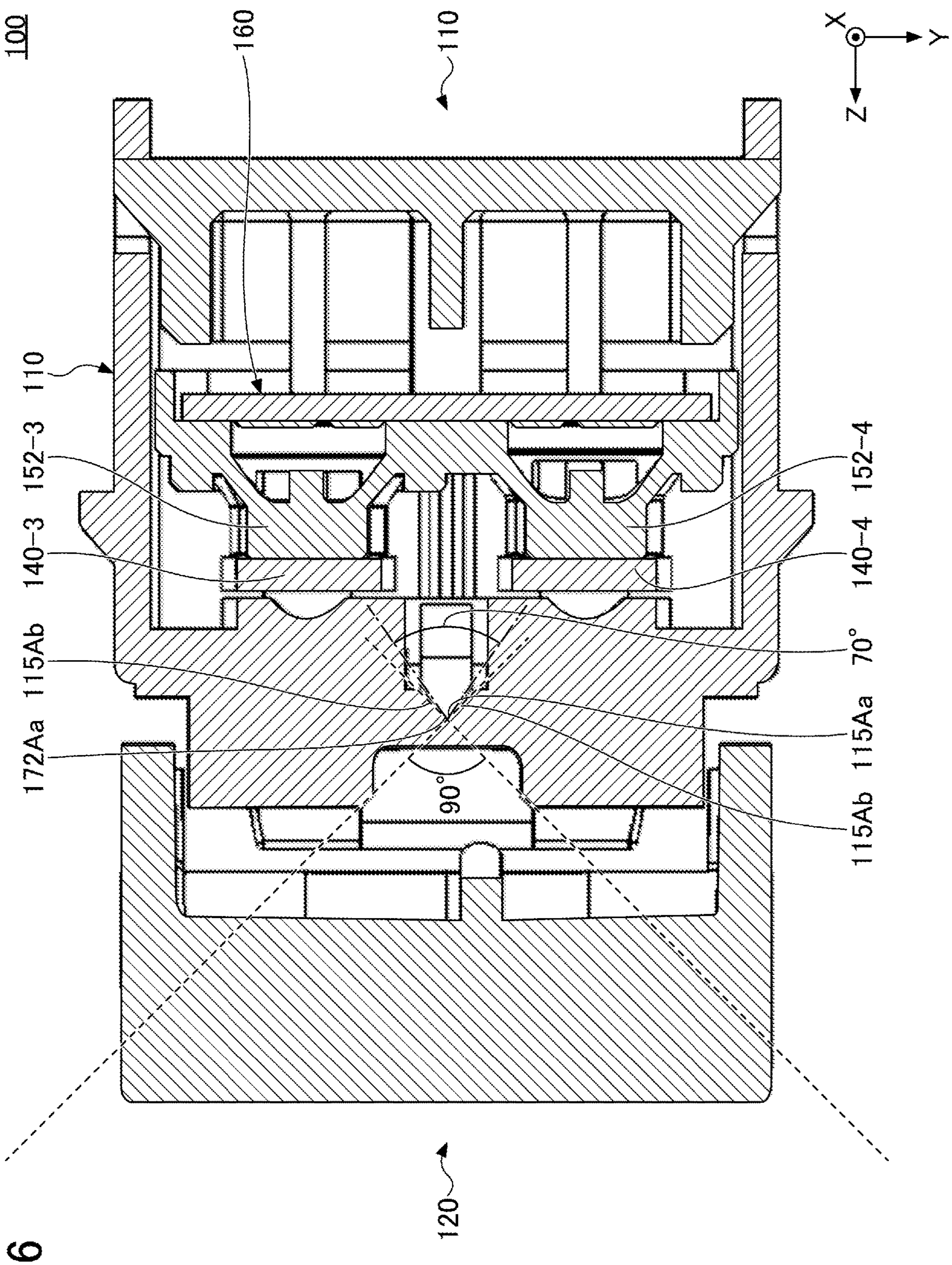
FIG. 16 is a cross-sectional view illustrating positioning of a lock portion and a swinging fulcrum of an input device according to an embodiment in a non-operated state, taken along a cross-sectioning line G-G indicated in FIG. 13.
Figure 19:
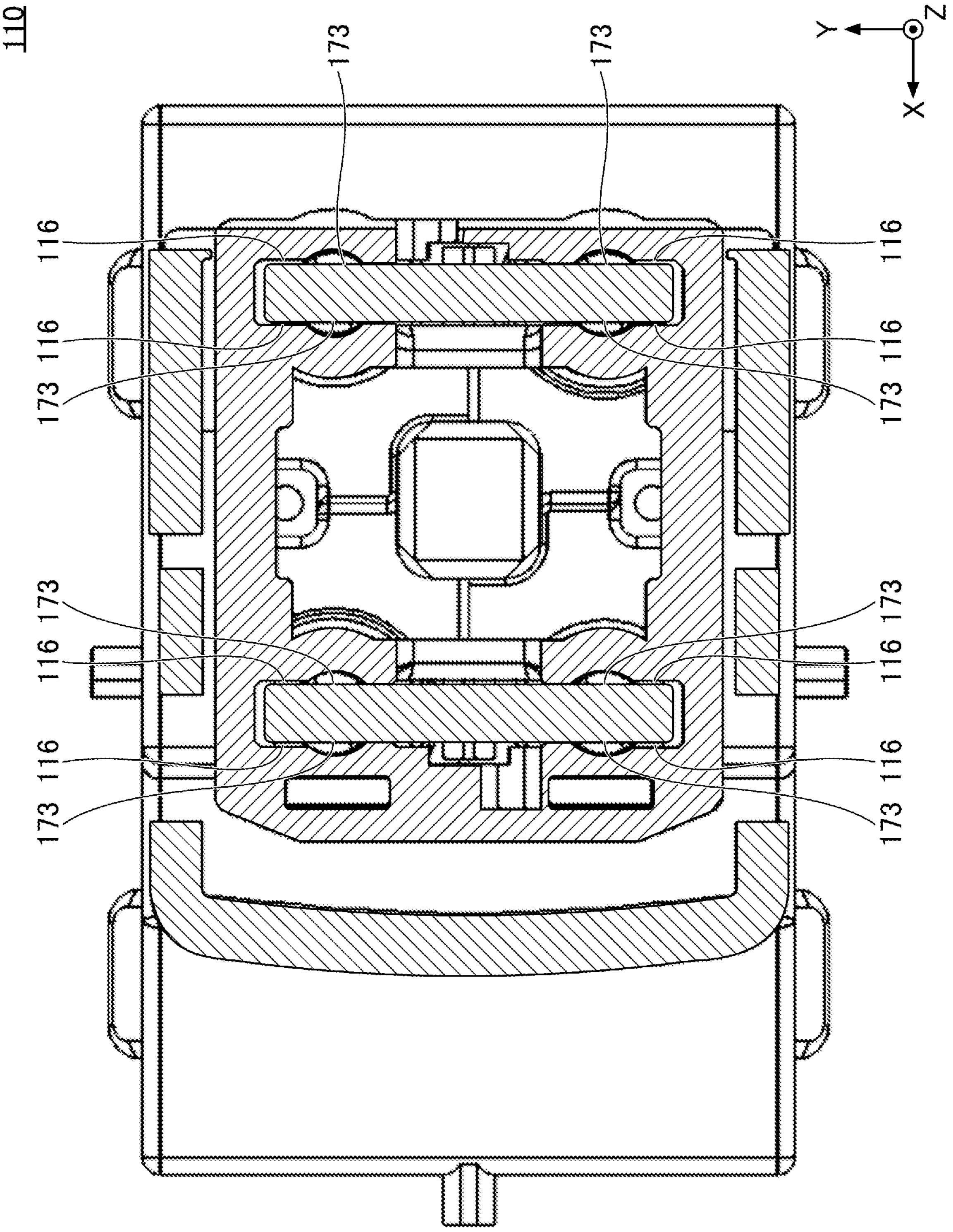
FIG. 19 is a cross-sectional view illustrating a cross-section of an input device according to an embodiment along a cross-sectioning line J-J indicated in FIG. 13.

FIG. 7A and FIG. 7B are oblique cross-sectional views illustrating a cross-section of the input device 100 according to an embodiment along a cross-sectioning line A-A (see FIG. 2). FIG. 8 is an oblique cross-sectional view illustrating a cross-section of the input device 100 according to an embodiment along a cross-sectioning line B-B (see FIG. 2). FIG. 9 is an oblique cross-sectional view illustrating a cross-section of the input device 100 according to an embodiment along a cross-sectioning line C-C (see FIG. 2). FIG. 10 is an oblique cross-sectional view illustrating a cross-section of the input device 100 according to an embodiment along a cross-sectioning line D-D (see FIG. 2). FIG. 11A is an oblique external view of the cam members 170-1 and 170-2 of the input device 100 according to an embodiment. FIG. 11B is a view of the cam member 170 of the input device 100 according to an embodiment, seen in a pivoting direction (X-axis direction) in which the operation knob 120 pivots. FIG. 11C is a view of the cam member 170 of the input device 100 according to an embodiment, seen in a direction (Y-axis direction) intersecting with the pivoting direction. FIG. 11D is a top view of the cam member 170 of the input device 100 according to an embodiment. FIG. 11E is a bottom view of the cam member 170 of the input device 100 according to an embodiment. FIG. 13 is a side view of the input device 100 according to an embodiment in a non-operated state. FIG. 14 is a side view of the input device 100 according to an embodiment in a state in which the operation knob 120 has pivoted to the end of the first angular range. FIG. 15 is a side view of the input device according to an embodiment in a state in which the operation knob 120 has pivoted to the end of the second angular range. FIG. 16 is a cross-sectional view illustrating positioning of a lock portion (vertex portion 172Aa) and a swinging fulcrum (vertex portion 115Aa) of the input device 100 according to an embodiment in a non-operated state. FIG. 17 is a cross-sectional view illustrating positioning of the lock portion (vertex portion 172Aa) and the swinging fulcrum (vertex portion 115Aa) of the input device 100 according to an embodiment in a state in which the operation knob 120 has pivoted to the end of the first angular range. FIG. 18 is a cross-sectional view illustrating positioning of the lock portion (vertex portion 172Aa) and the swinging fulcrum (vertex portion 115Aa) of the input device 100 according to an embodiment in a state in which the operation knob 120 has pivoted to the end of the second angular range. FIG. 19 is a cross-sectional view illustrating a cross-section of the input device according to an embodiment along the cross-sectioning line J-J.

As illustrated in FIGS. 11A, 11B, 11C, 11D, and 11E, each of the cam members 170-1 and 170-2 includes the engaging projection 172 that projects downward from the left-right direction (Y-axis direction) center of the bottom surface of the main body portion 171.

As illustrated in FIGS. 11A, 11B, 11C, 11D, and 11E, the engaging projection 172 has protruding portions 172A on the front (X-axis positive direction) and the rear (X-axis negative direction) thereof, respectively, the protruding portions 172A being protruding with respect to the main body portion 171 frontward (X-axis positive direction) and rearward (X-axis negative direction), respectively. Hence, the front-rear direction (X-axis direction) width of the engaging projection 172 is greater than the front-rear direction (X-axis direction) width of the main body portion 171.

When seen in an X-axis direction plan view, the protruding portions 172A each have an isosceles triangular shape having the vertex portion 172Aa on an upper end portion thereof (i.e., the isosceles triangular shape sharpening upward). That is, the vertex portions 172Aa of the protruding portions 172A are situated at the left-right direction (Y-axis direction) center of the cam member 170-1 and the cam member 170-2.

The front-rear direction (X-axis direction) width of the engaging projection 172 of the cam member 170-1 is greater than the front-rear direction (X-axis direction) width of an upper opening of the first supporting hole 112-1 (the upper opening being a portion at which a regulating wall 115A described below is situated).

Hence, with the input device 100 according to an embodiment, by pushing the engaging projection 172 of the cam member 170-1 into the first supporting hole 112-1 through the upper opening of the first supporting hole 112-1, it is possible to fit the engaging projection 172 of the cam member 170-1 easily into the first supporting hole 112-1 while elastically deforming the beam portion 115-1 and thrustfully widening the front-rear direction width of the upper opening of the first supporting hole 112-1.

In the input device 100 according to an embodiment, the front-rear direction (X-axis direction) width of the engaging projection 172 of the cam member 170-1 fitted in the first supporting hole 112-1 is greater than that of the upper opening of the first supporting hole 112-1. Hence, in the input device 100 according to an embodiment, the cam member 170-1 is locked from moving upward, by the vertex portion 172Aa of the protruding portion 172A of the cam member 170-1 having contact with a lower surface of the regulating wall 115A that is situated at the upper opening of the first supporting hole 112-1. Hence, the cam member 170-1 is prevented from readily slipping out of the first supporting hole 112-1.

That is, the vertex portion 172Aa of the engaging projection 172 of the cam member 170-1 constitutes "a lock portion that can be locked by being snapped in".

As illustrated in FIG. 11A to FIG. 11E and FIG. 19, the cam member 170-1 includes slid-on portions 173 that are situated on the X-axis positive direction side of the main body portion 171 and on the X-axis negative direction side of the main body portion 171. The slid-on portions 173 have a shape that can slide on guide surfaces 116, which are described in detail below. The slid-on portions 173 have a planar shape parallel with the YZ plane. The housing 110 includes the guide surfaces 116 that have a planar shape parallel with the YZ plane and are situated to face the slid-on portions 173. After the engaging projection 172 is fitted in the first supporting hole 112-1, the cam member 170-1 is guided in the YZ plane direction by the slid-on portions 173 being guided by the guide surfaces 116. Hence, the cam member 170-1 becomes supported such that it can swing in the left-right direction (Y-axis direction) between a wall portion of the beam portion 115-1 on the front side (X-axis positive side) and a wall portion of the beam portion 115-1 on the rear side (X-axis negative side). The front-rear direction (X-axis direction) width of the main body portion 171 of the cam member 170-1 is approximately equal to the interval between the internal wall surface of the beam portion 115-1 on the front side (X-axis positive side) and the internal wall surface of the beam portion 115-1 on the rear side (X-axis negative side). Hence, the cam member 170-1 can swing in the left-right direction (Y-axis direction) while being inhibited from backlash in the front-rear direction (X-axis direction).

Likewise, the front-rear direction (X-axis direction) width of the engaging projection 172 of the cam member 170-2 is greater than the front-rear direction (X-axis direction) width of an upper opening of the first supporting hole 112-2 (the upper opening being a portion at which a regulating wall 115A described below is situated).

Hence, with the input device 100 according to an embodiment, by pushing the engaging projection 172 of the cam member 170-2 into the first supporting hole 112-2 through the upper opening of the first supporting hole 112-2, it is possible to fit the engaging projection 172 of the cam member 170-2 easily into the first supporting hole 112-2 while elastically deforming the beam portion 115-2 and thrustfully widening the front-rear direction width of the upper opening of the first supporting hole 112-2.

In the input device 100 according to an embodiment, the front-rear direction (X-axis direction) width of the engaging projection 172 of the cam member 170-2 fitted in the first supporting hole 112-2 is greater than that of the upper opening of the first supporting hole 112-2. Hence, in the input device 100 according to an embodiment, the cam member 170-2 is prevented from readily slipping out of the first supporting hole 112-2, by being locked from moving upward, by the vertex portion 172Aa of the protruding portion 172A of the cam member 170-2 having contact with a lower surface of the regulating wall 115A that is situated at the upper opening of the first supporting hole 112-2.

That is, the engaging projection 172 of the cam member 170-2 and the regulating wall 115A of the first supporting hole 112-2 constitute a shape relating to snap-in locking. The vertex portion 172Aa of the engaging projection 172 is an example of the "lock portion". The vertex portion 115Aa of the regulating wall 115A is an example of the "swinging fulcrum".

The cam member 170-2 includes slid-on portions 173 that are situated on the X-axis positive direction side of the main body portion 171 and on the X-axis negative direction side of the main body portion 171. The slid-on portions 173 have a planar shape parallel with the YZ plane. The housing 110 includes guide surfaces 116 that have a planar shape parallel with the YZ plane and are situated to face the slid-on portions 173. After the engaging projection 172 is fitted in the first supporting hole 112-2, the cam member 170-2 is guided in the YZ plane direction by the slid-on portions 173 being guided by the guide surfaces 116. Hence, the cam member 170-2 becomes supported such that it can swing in the left-right direction (Y-axis direction) between a wall portion of the beam portion 115-2 on the front side (X-axis positive side) and a wall portion of the beam portion 115-2 on the rear side (X-axis negative side). The front-rear direction (X-axis direction) width of the main body portion 171 of the cam member 170-2 is approximately equal to the interval between the internal wall surface of the beam portion 115-2 on the front side (X-axis positive side) and the internal wall surface of the beam portion 115-2 on the rear side (X-axis negative side). Hence, the cam member 170-2 can swing in the left-right direction (Y-axis direction) while being inhibited from backlash in the front-rear direction (X-axis direction).

As illustrated in FIG. 7B, FIG. 11A to FIG. 11C, and FIG. 11E, in the input device 100 according to an embodiment, the engaging projection 172 of each of the cam member 170-1 and the cam member 170-2 has a tapered shape (snap-in inclination 174), of which the front-rear direction (X-axis direction) width gradually decreases downward. The front-rear direction (X-axis direction) width of the lower end portions of the cam member 170-1 and the cam member 170-2 is smaller than that of the upper opening of the first supporting hole 112-1 and of the upper opening of the first supporting hole 112-2. Hence, with the input device 100 according to an embodiment, it is easy to position the cam member 170-1 and the cam member 170-2 in the right place when fitting them into the first supporting hole 112-1 and the first supporting hole 112-2. As illustrated in FIG. 4 and FIG. 5C, the beam portion 115-1 constituting the first supporting hole 112-1 and the beam portion 115-2 constituting the first supporting hole 112-2 each have a tapered shape (snap-in inclination 117) that is approximately parallel with the snap-in inclination 174. Hence, after the positioning in place, it is easy to perform the assembling operation of fitting the cam member 170-1 and the cam member 170-2 into the first supporting hole 112-1 and the first supporting hole 112-2, by elastically deforming the beam portion 115-1 and the beam portion 115-2. As illustrated in FIG. 4, the guide portions 118 constituting the second supporting holes 113-1 to 113-4 are situated under the main body portions 171 of the cam members 170 at positions overlapping the main body portions 171 in the Z-axis direction. Hence, after snap-in coupling, the cam members 170 are prevented from slipping out of the housing 110, because they are supported by means of the main body portions 171 contacting the guide portions 118 even in a state in which they receive no restoring forces from the dome portions 152.

As illustrated in FIG. 5A, FIG. 5B, FIG. 7B, FIG. 9, and FIG. 16 to FIG. 18, the regulating wall 115A is situated at a rear-side (X-axis negative-side) edge portion of the upper opening of the first supporting hole 112-1, such that the regulating wall 115A projects into the first supporting hole 112-1. The lower surface of the regulating wall 115A has an isosceles triangle-like groove shape that is sharpening upward. The vertex portion 172Aa of the protruding portion 172A of the cam member 170-1 has a curved surface shape and is configured to contact (have a surface contact with) the vertex portion 115Aa, which is situated on the lower surface of the regulating wall 115A, from below the vertex portion 115Aa, the vertex portion 115Aa having a curved surface shape of which the curvature is greater than that of the vertex portion 172Aa. Hence, the cam member 170-1 is positioned exactly in the right place at the left-right direction (Y-axis direction) center in the wall portion 111 of the housing 110. By the vertex portion 172Aa contacting the vertex portion 115Aa on the lower surface of the regulating wall 115A, the cam member 170-1 can swing in the left-right direction (Y-axis direction), with the vertex portion 115Aa serving as the "swinging fulcrum". In the present embodiment, the surface contacting configuration between the "swinging fulcrum" and the "lock portion" has been described. However, it is only necessary that a force of friction between the "swinging fulcrum" and the "lock portion", which occurs when the cam member 170 starts swinging, is small, and the surface contacting configuration between curved surface shapes is not essential. That is, the "swinging fulcrum" and the "lock portion" may be configured to have a point contact or a linear contact. In the present embodiment, when seen in the X-axis direction, the vertex portion 115Aa and first tapered portions 115Ab constituting the regulating wall 115A form a shape of a vertex portion of a re-entrant angle that has the first tapered portions 115Ab on both sides of the vertex portion 115Aa serving as the vertex of the re-entrant angle. The first tapered portions 115Ab are situated on both sides of the vertex portion 115Aa in the Y-axis direction such that the vertex portion 115Aa is sandwiched in between. When seen in the X-axis direction, the vertex portion 172Aa and second tapered portions 172Ab constituting the protruding portion 172A of the engaging projection 172 form a shape of a vertex portion of a salient angle that has the second tapered portions 172Ab on both sides of the vertex portion 172Aa serving as the vertex of the salient angle. The second tapered portions 172Ab are situated on both sides of the vertex portion 172Aa in the Y-axis direction such that the vertex portion 172Aa is sandwiched in between. Specifically, in the present embodiment, the angle of the re-entrant angle formed by the pair of first tapered portions 115Ab is 90° [deg], and the angle of the salient angle formed by the pair of second tapered portions 172Ab is 70° [deg]. Hence, when the operation knob 120 is freed from a state of being operated by the operator and is going to be restored to the initial state by receiving restoring forces from the dome portions 152, the vertex portion 172Aa of the cam member 170 comes into contact with the regulating wall 115A. Afterward, the cam member 170 slides and transits over the first tapered portion 115Ab until the vertex portion 172Aa contacts the vertex portion 115Aa, and is restored to the initial position.

Likewise, the regulating wall 115A is situated at a front-side (X-axis positive-side) edge portion of the upper opening of the first supporting hole 112-2, such that the regulating wall 115A projects into the first supporting hole 112-2. The lower surface of the regulating wall 115A has an isosceles triangle-like groove shape that is sharpening upward. The vertex portion 172Aa of the protruding portion 172A of the cam member 170-2 is configured to contact (have a surface contact with) the vertex portion 115Aa, which is situated on the lower surface of the regulating wall 115A, from below the vertex portion 115Aa. Hence, the cam member 170-2 is positioned exactly in the right place at the left-right direction (Y-axis direction) center in the wall portion 111 of the housing 110. By the vertex portion 172Aa contacting the vertex portion 115Aa on the lower surface of the regulating wall 115A, the cam member 170-2 can swing in the left-right direction (Y-axis direction), with the vertex portion 172Aa and the vertex portion 115Aa serving as the fulcrum.

In the input device 100 according to an embodiment, when the operation knob 120 after being pivotally operated is freed from the operation force, the cam member 170-1 and the cam member 170-2 can be each restored to a horizontal state, by being biased upward on the left and on the right equally by the restoring forces from the left and right two dome portions 152. Here, the cam member 170-1 and the cam member 170-2 can maintain the state of being positioned exactly in the right place at the left-right direction (Y-axis direction) center, since their vertex portions 172Aa are thrust against the vertex portions 115Aa on the lower surfaces of the regulating walls 115A. In the input device 100 according to an embodiment, by the cam member 170-1 and the cam member 170-2 being positioned exactly in the right place at the left-right direction (Y-axis direction) center, the side surfaces of the cam member 170-1 and the cam member 170-2 in the left-right direction (Y-axis direction) can be inhibited from contacting and being scraped by the internal wall surfaces of the wall portion 111 of the housing 110 or acting as resistance in the swinging movement.

(Method for Assembling Input Device 100)

The procedure of the method for assembling the input device 100 according to an embodiment will be described with reference to FIG. 12A to FIG. 12G. FIG. 12A to FIG. 12G are views illustrating the procedure of the method for assembling the input device 100 according to an embodiment.

Figure 12A:
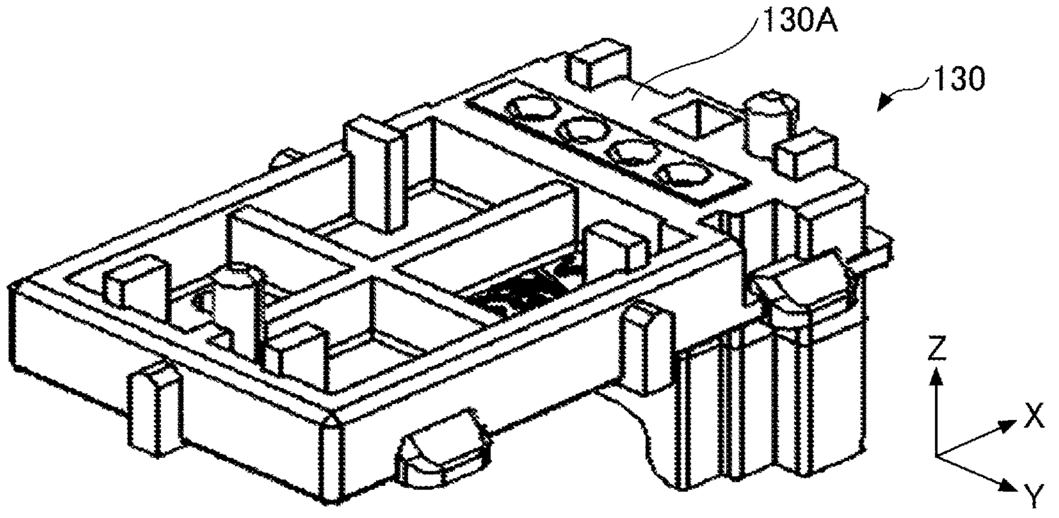
FIG. 12A is a view illustrating the procedure of a method for assembling an input device according to an embodiment.
Figure 12B:
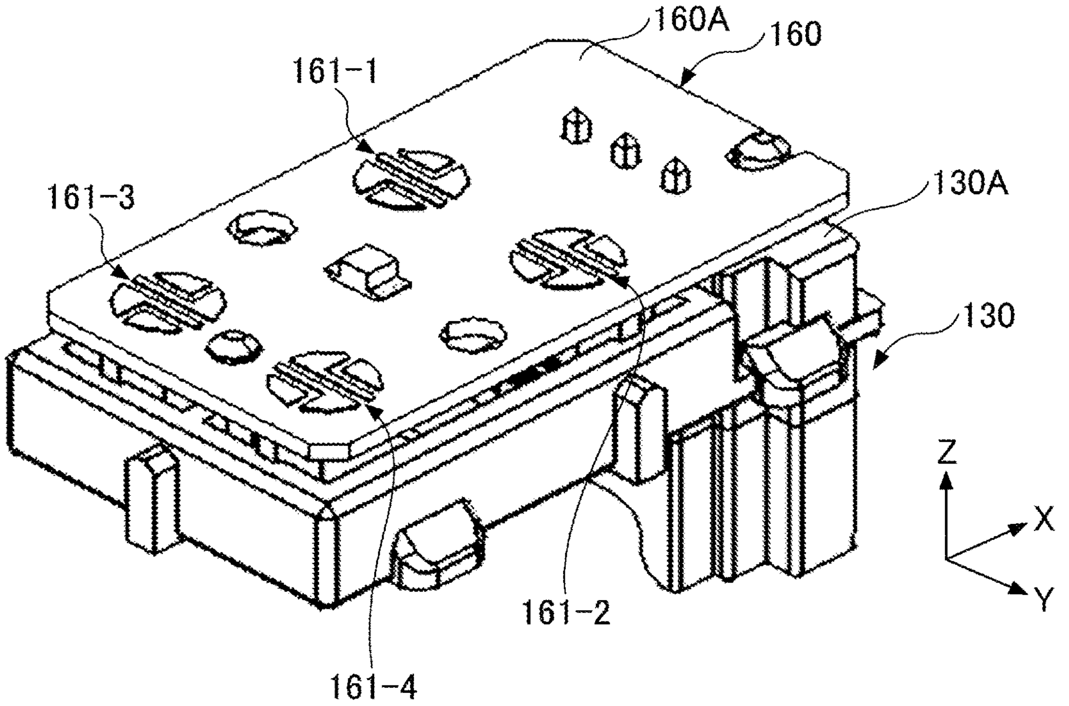
FIG. 12B is a view illustrating the procedure of a method for assembling an input device according to an embodiment.
Figure 12C:
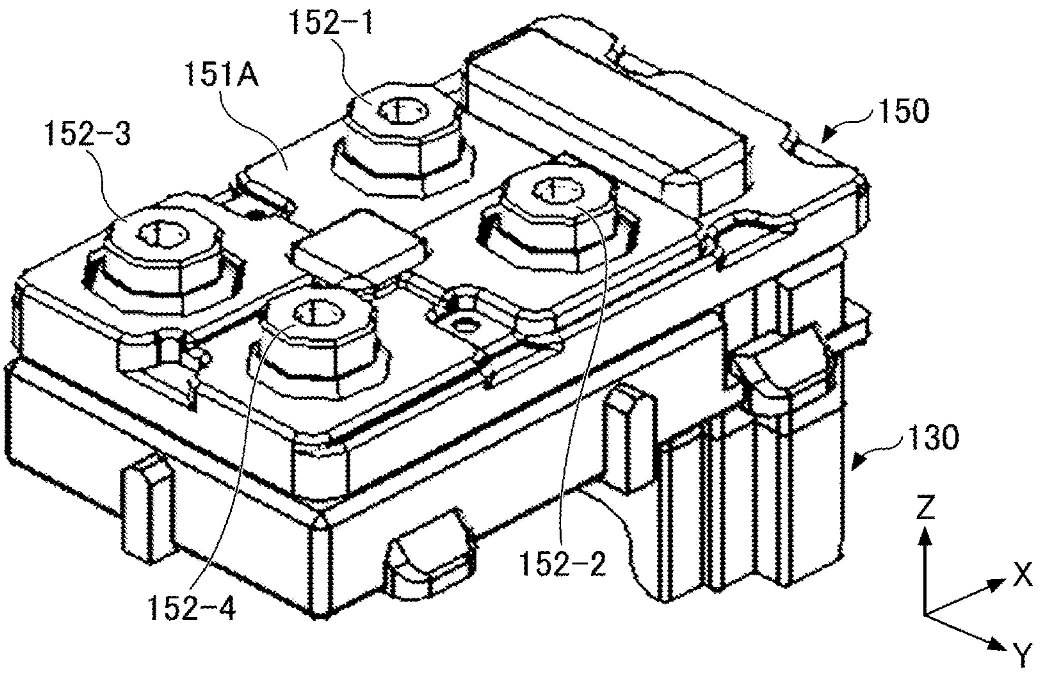
FIG. 12C is a view illustrating the procedure of a method for assembling an input device according to an embodiment.

First, as illustrated in FIG. 12A and FIG. 12B, the substrate 160 is placed on the upper surface 130A of the cover 130. Next, as illustrated in FIG. 12C, the rubber sheet 150 is overlaid on the upper surface of the substrate 160.

Figure 12D:
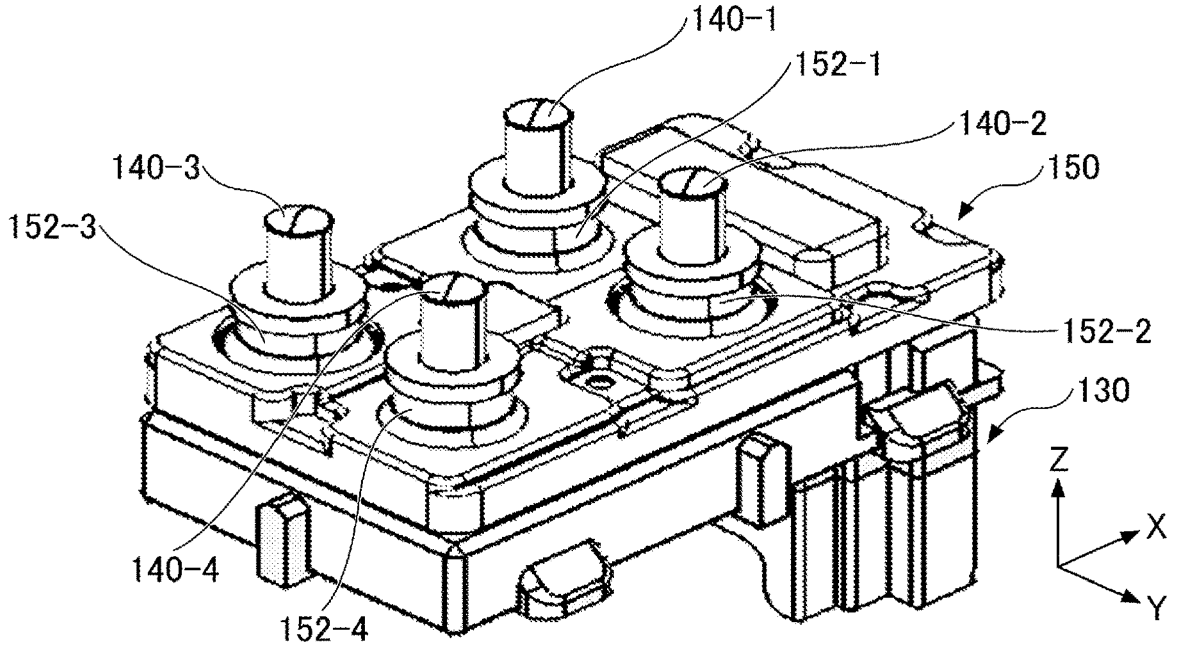
FIG. 12D is a view illustrating the procedure of a method for assembling an input device according to an embodiment.

Next, as illustrated in FIG. 12D, the four actuators 140-1 to 140-4 are placed on the upper surfaces of the four dome portions 152-1 to 152-4 of the rubber sheet 150, respectively.

Figure 12E:
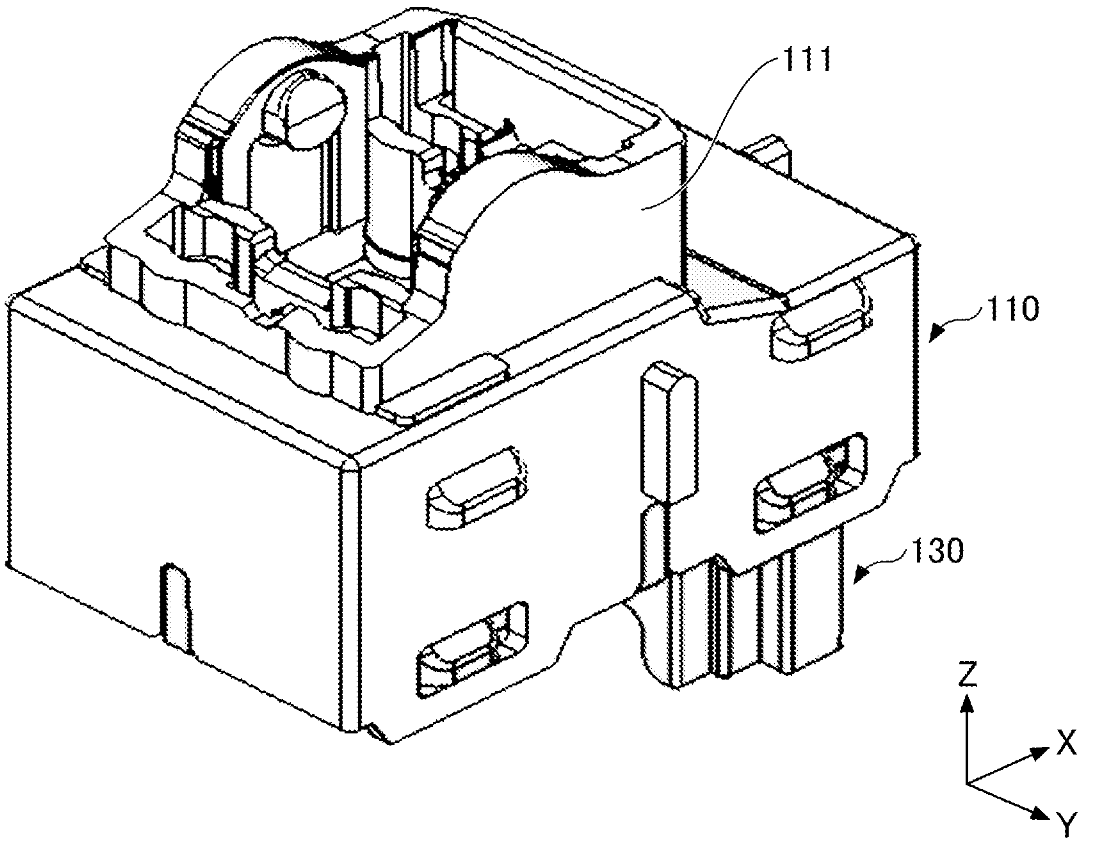
FIG. 12E is a view illustrating the procedure of a method for assembling an input device according to an embodiment.

Next, as illustrated in FIG. 12E, the lower opening portion 110A of the housing 110 is fitted onto the cover 130 from above.

Figure 12F:
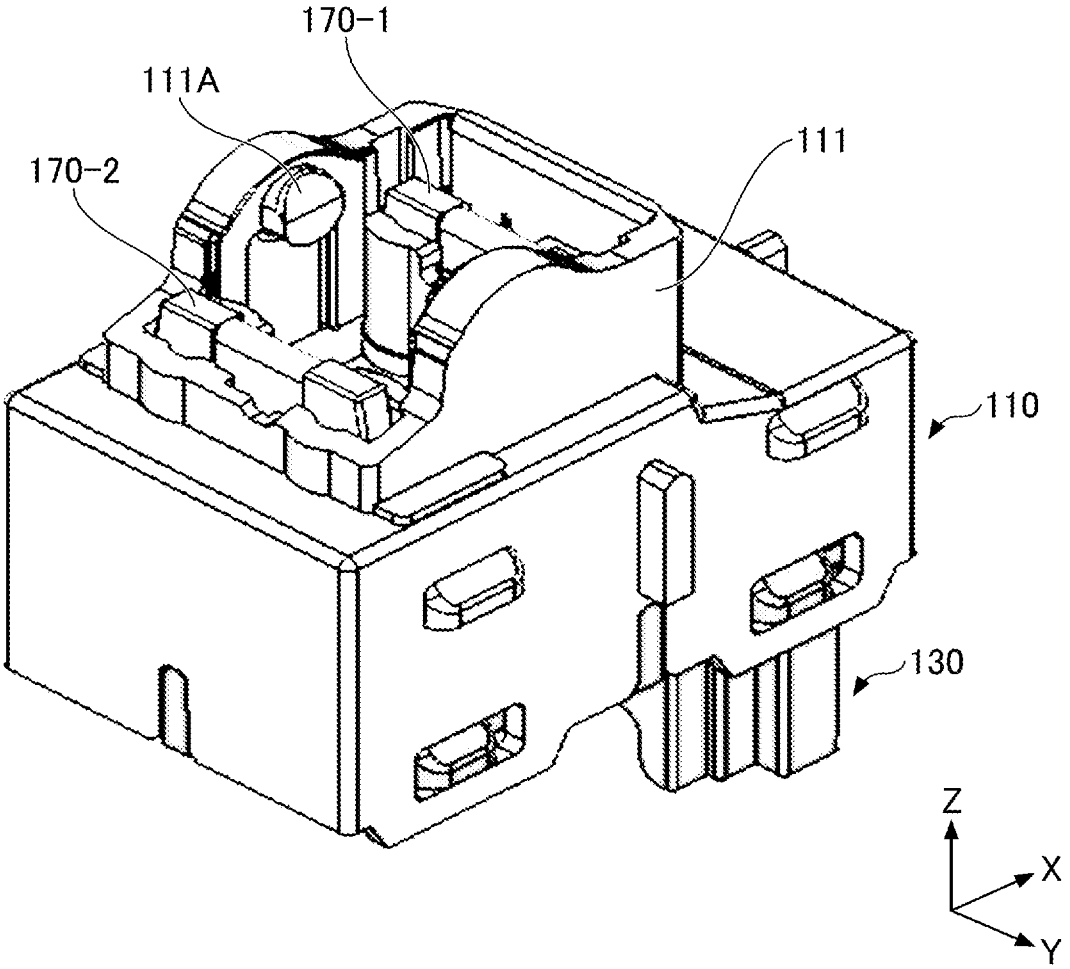
FIG. 12F is a view illustrating the procedure of a method for assembling an input device according to an embodiment.

Next, as illustrated in FIG. 12F, the engaging projections 172 of the cam members 170-1 and 170-2 are fitted into the first supporting holes 112-1 and 112-2 of the housing 110 from above by snap-in, respectively, to assemble the cam members 170-1 and 170-2 into the housing 110.

Figure 12G:
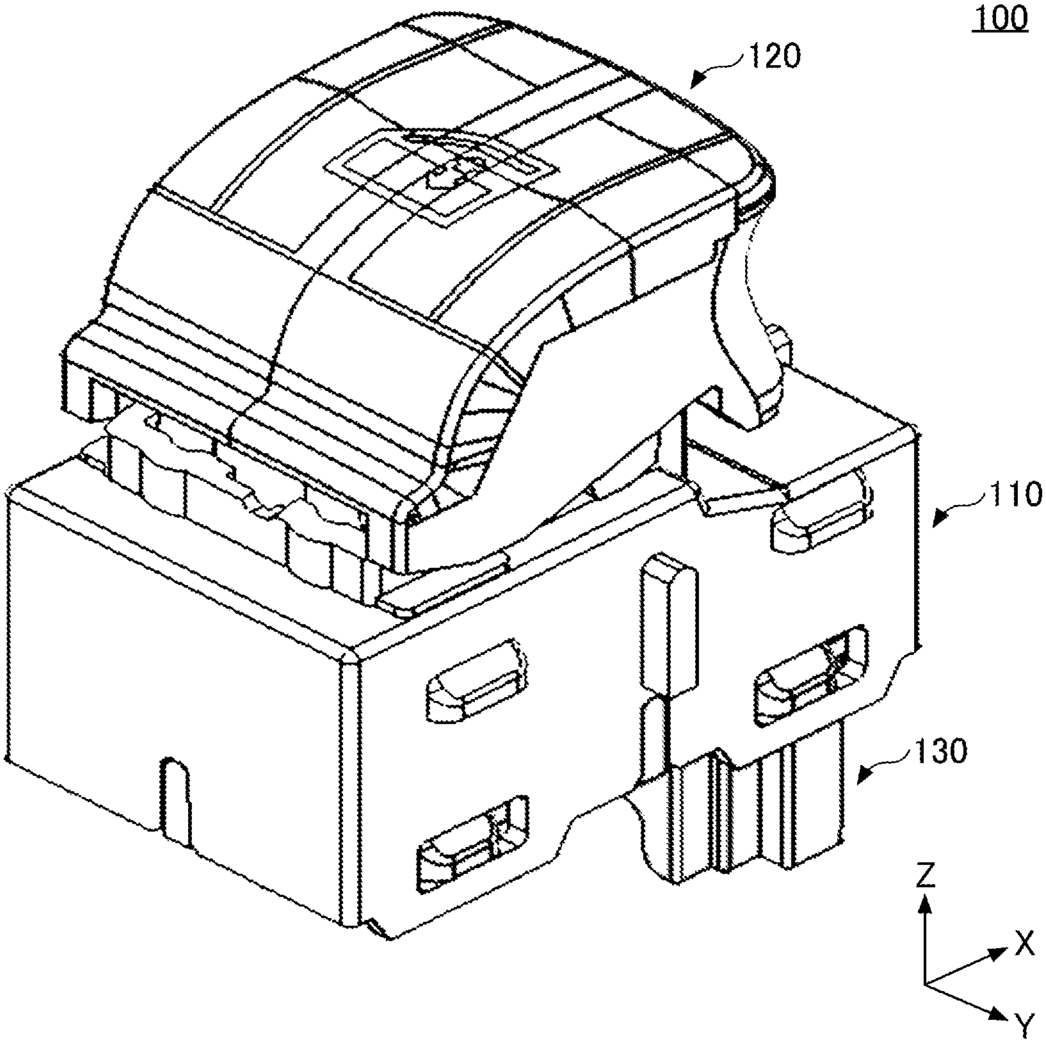
FIG. 12G is a view illustrating the procedure of a method for assembling an input device according to an embodiment.

Lastly, as illustrated in FIG. 12G, the pair of bearing holes 121A of the operation knob 120 are fitted respectively on the pair of projecting portions 111A of the housing 110 from above, to attach the operation knob 120 onto the housing 110.

As described, with the input device 100 according to an embodiment, it is possible to finish assembling the input device 100 by stacking up the plurality of parts in order. That is, with the input device 100 according to an embodiment, it is possible to finish assembling the input device 100 relatively easily without turning any part upside down.

The input device 100 according to an embodiment includes: the housing 110; the operation knob 120 supported on the housing 110 and configured to pivot by receiving an operation force from an operator; the cam members 170-1 and 170-2 situated swingably in a swinging direction intersecting with a pivoting direction in which the operation knob 120 pivots, and configured to perform swinging as a first movement when the operation knob 120 pivots in a first angular range, and to perform swinging as a second movement when the operation knob 120 pivots in a second angular range succeeding the first angular range; the first switches configured to be switched on in conjunction with the first movement; and the second switches configured to be switched on in conjunction with the second movement. When the input device 100 is released from the operation force, automatic restoration occurs by restoring forces from the first switches and the second switches. The input device 100 includes: the actuators 140-1 and 140-4 configured to slide toward the first switches in conjunction with the first movement; and the actuator 140-2 and 140-3 configured to slide toward the second switches in conjunction with the second movement.

Hence, in the input device 100 according to an embodiment, the first switches and the second switched can be pushed straightly downward by the actuators 140-1 and 140-4 and the actuators 140-2 and 140-3. Hence, it is possible to inhibit occurrence of malfunctions of the first switches and the second switches.

The input device 100 according to an embodiment includes the lock portions (vertex portions 172Aa) having a shape of a vertex of a salient angle and capable of locking the cam members 170-1 and 170-2 and the housing 110 by snap-in.

Hence, in the input device 100 according to an embodiment, the cam members 170-1 and 170-2 can be easily assembled on the housing 110. In the input device 100 according to an embodiment, the cam members 170-1 and 170-2 can be inhibited from slipping out of the housing 110 after the cam members 170-1 and 170-2 are assembled on the housing 110.

In the input device 100 according to an embodiment, in a non-operated state, the lock portions (vertex portions 172Aa) contact the swinging fulcrums (vertex portions 115Aa) having a shape of a vertex of a re-entrant angle, while maintaining a swingable state.

Hence, in the input device 100 according to an embodiment, the lock portions have a shape that realizes both of: the function of being locked by being snapped in; and the function as a fulcrum for the operation knob 120 to swing. Hence, it is possible to simplify the configuration relating to these two functions.

In the input device 100 according to an embodiment, the housing 110 includes: the wall portion 111 supporting the operation knob 120; and the beam portions 115-1 and 115-2 supported on the wall portion 111 and situated to extend in a direction intersecting with the pivoting direction of the operation knob 120. The swinging fulcrums (vertex portions 115Aa) of the housing 110 are situated on the beam portions 115-1 and 115-2.

Hence, with the input device 100 according to an embodiment, it is possible to easily assemble the cam members 170-1 and 170-2 on the housing 110 by elastically deforming the beam portions 115-1 and 115-2.

In the input device 100 according to an embodiment, the beam portions 115-1 and 115-2 have a plate shape and are situated elastically deformably.

Hence, with the input device 100 according to an embodiment, it is possible to easily assemble the cam members 170-1 and 170-2 on the housing 110 by elastically deforming the beam portions 115-1 and 115-2.

In the input device 100 according to an embodiment, in a plan view in the Z-axis direction, the first switches and the second switches are situated inside the periphery of the operation knob 120 and positioned overlappingly with the operation knob 120.

In the input device 100 according to an embodiment, in a plan view in the Z-axis direction, the swinging fulcrums are situated inside the periphery of the operation knob 120 and positioned overlappingly with the operation knob 120.

In the input device 100 according to an embodiment, the first switches and the second switches are rubber dome switches.

Hence, in the input device 100 according to an embodiment, the first switches and the second switches, all of which are rubber dome switches, can be pushed straightly downward by the actuators 140-1 and 140-4 and the actuators 140-2 and 140-3. Hence, the first switches and the second switches can be inhibited from causing rubber dome switch-specific malfunctions.

An embodiment of the present invention has been described in detail above. However, the present invention is not limited to the embodiment, and various modifications or changes can be applied within the scope of the spirit of the present invention described in the claims.

What is claimed is:

1. An input device, comprising:

a housing;

an operation knob supported on the housing and configured to pivot by receiving an operation force from an operator;

a cam member situated swingably in a direction intersecting with a pivoting direction in which the operation knob pivots, and configured to perform swinging as a first movement in response to the operation knob pivoting in a first angular range and to perform swinging as a second movement succeeding the first movement in response to the operation knob pivoting in a second angular range succeeding the first angular range;

a substrate situated in the housing;

a first switch situated on the substrate and configured to be switched on in conjunction with the first movement of the cam member; and a second switch situated on the substrate and configured to be switched on in conjunction with the second movement of the cam member, wherein when the operation force on the input device is ceased, the operation knob is automatically restored by restoring forces from the first switch and the second switch, the input device further comprises:

a first actuator configured to be slid in conjunction with the first movement of the cam member and push the first switch in a direction perpendicular to the substrate; and a second actuator configured to be slid in conjunction with the second movement of the cam member and push the second switch in the direction perpendicular to the substrate.

2. The input device according to claim 1, wherein the housing includes a guide surface having a planar shape parallel with the direction in which the cam member is swingable, and the cam member includes a slid-on portion contacting the guide surface and configured to slide on the guide surface as the cam member swings.

3. The input device according to claim 1, wherein in a plan view seen in the direction perpendicular to the substrate, the first switch and the second switch are positioned overlappingly with the operation knob.

4. The input device according to claim 1, wherein the first switch and the second switch are rubber dome switches.

5. The input device according to claim 1, wherein the cam member includes a lock portion that can be locked on the housing by a snap-in operation.

6. The input device according to claim 5, wherein the housing includes a swinging fulcrum configured to contact the lock portion of the cam member and support the lock portion in a non-operated state in which the automatically restoring has been completed, and when seen in a direction perpendicular to the direction in which the cam member is swingable, the lock portion is a vertex of a salient angle, and the swinging fulcrum is a vertex of a re-entrant angle.

7. The input device according to claim 6, wherein in a plan view seen in the direction perpendicular to the substrate, the swinging fulcrum is positioned overlappingly with the operation knob.

8. The input device according to claim 6, wherein the cam member includes a pair of first tapered portions situated on both sides of the lock portion in the direction in which the cam member is swingable, such that the lock portion is sandwiched between the pair of first tapered portions, and the housing includes a pair of second tapered portions situated on both sides of the swinging fulcrum in the direction in which the cam member is swingable, such that the swinging fulcrum is sandwiched between the pair of second tapered portions.

9. The input device according to claim 6, wherein the salient angle has an angle smaller than an angle of the re-entrant angle.

10. The input device according to claim 6, wherein the housing includes:

a wall portion supporting the operation knob; and a beam portion supported on the wall portion and situated to extend in the direction intersecting with the pivoting direction, wherein the swinging fulcrum of the housing is situated on the beam portion.

11. The input device according to claim 10, wherein the beam portion has a plate shape and is situated elastically deformably.

* * * * *